(12) United States Patent
Lessley et al.

(10) Patent No.: US 9,724,722 B2
(45) Date of Patent: Aug. 8, 2017

(54) RAPID CHANGEOVER SLOT DIE ASSEMBLY FOR A FLUID APPLICATION DEVICE

(71) Applicant: Illinois Tool Works Inc., Glenview, IL (US)

(72) Inventors: Mel Steven Lessley, Villa Hills, KY (US); Jonathan David Cunningham, Hermitage, TN (US); Andreas Pahl, Erkrath (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/732,606

(22) Filed: Jun. 5, 2015

(65) Prior Publication Data

US 2015/0352588 A1    Dec. 10, 2015

Related U.S. Application Data

(60) Provisional application No. 62/038,691, filed on Aug. 18, 2014, provisional application No. 62/025,116, filed on Jul. 16, 2014, provisional application No. 62/010,041, filed on Jun. 10, 2014.

(51) Int. Cl.

| | |
|---|---|
| *B05C 3/02* | (2006.01) |
| *B05C 5/02* | (2006.01) |
| *B05B 15/06* | (2006.01) |
| *B29C 47/08* | (2006.01) |
| *B29C 47/14* | (2006.01) |
| *B29C 47/00* | (2006.01) |

(52) U.S. Cl.
CPC .......... *B05C 5/0254* (2013.01); *B05B 15/065* (2013.01); *B29C 47/00* (2013.01); *B29C 47/0828* (2013.01); *B29C 47/14* (2013.01)

(58) Field of Classification Search
USPC ......... 118/410, 411, 413; 239/451, 597, 598
See application file for complete search history.

(56) References Cited

U.S. PATENT DOCUMENTS

| | | | |
|---|---|---|---|
| 5,000,112 A | 3/1991 | Rothen et al. | |
| 5,894,994 A * | 4/1999 | Keane | B05C 5/0258 239/134 |
| 6,001,178 A * | 12/1999 | Borgmann | B05C 5/0241 118/410 |
| 7,152,815 B2 | 12/2006 | Harris et al. | |
| 7,399,361 B2 | 7/2008 | de Leeuw et al. | |

(Continued)

FOREIGN PATENT DOCUMENTS

CN    201474289 U  *  5/2010

*Primary Examiner* — Yewebdar Tadesse
(74) *Attorney, Agent, or Firm* — Levenfeld Pearlstein, LLC

(57) ABSTRACT

A fluid application device having an applicator head, a slot die assembly and a securing mechanism for securing the slot die assembly to the applicator head is provided. The slot die assembly includes a die extruder comprising one or more fluid input ports configured to receive a fluid from the applicator head, a shim positioned adjacent to the die extruder, and a plate positioned adjacent to the shim on a side of the shim opposite from the die extruder. The securing mechanism includes a securing component at one of the applicator head and the slot die assembly and a corresponding securing component at the other of the applicator head and slot die assembly.

10 Claims, 23 Drawing Sheets

(56) References Cited

U.S. PATENT DOCUMENTS

| | | |
|---|---|---|
| 7,507,295 B2 | 3/2009 | Ganzer et al. |
| 7,699,243 B2 | 4/2010 | Starke |
| 7,798,434 B2 | 9/2010 | Bondeson et al. |
| 8,399,053 B2 | 3/2013 | Bondeson et al. |
| 8,535,756 B2 | 9/2013 | Bondeson et al. |
| 8,677,928 B2 | 3/2014 | Kufner et al. |
| 2012/0073497 A1 | 3/2012 | Kufner et al. |
| 2013/0269604 A1 | 10/2013 | Miyamoto |

\* cited by examiner

RAPID CHANGEOVER SLOT DIE ASSEMBLY FOR A FLUID APPLICATION DEVICE

BACKGROUND

The following description relates to a slot die assembly for a fluid application device, and in particular, slot die assembly configured for rapid changeover in a fluid application device.

Nonwoven fabrics are engineering fabrics that provide specific functions such as absorbency, liquid repellence, resilience, stretch, softness, strength, flame retardant protection, easy cleaning, cushioning, filtering, use as a bacterial barrier and sterility. In combination with other materials, the nonwoven materials can provide a spectrum of products with diverse properties and can be used alone or as components of hygiene apparel including disposable hygiene products, home furnishings, health care, engineering, industrial and consumer goods.

One or more elasticated strands may be positioned on and bonded to the nonwoven materials to, for example, provide flexibility in the product for fitting around an object or a person. The strands may be bonded to the nonwoven fabric with an adhesive in the form of a glue fiber.

An adhesive application device may apply adhesive to the strands with a nozzle assembly, such as a die and shim extruder assembly. A die and shim extruder assembly typically includes a die extruder, a plate, and a shim positioned between the die extruder and plate. Typically, a plurality of threaded fasteners are received through respective cylindrical bores in the die extruder and received in the applicator head.

To remove or replace the die and shim extruder assembly form the applicator head, an operator rotates each fastener to remove the fastener from the applicator head and the die extruder. Conversely, to secure the die and shim extruder assembly to the applicator head, an operator inserts the fasteners through the respective bores of the die extruder and rotates the fasteners to secure them within the applicator head.

However, the actuation and complete removal or insertion of individual fasteners may be time consuming. In addition, it may burdensome to the operator to collect and store each fastener as it is removed from the die extruder. In some cases, fasteners may be mishandled or lost, leading to further installation or removal delays.

Accordingly, there is a need for a die and shim extruder assembly that may be secured to or removed from an applicator head of a fluid application device without complete removal of the fasteners extending between the die extruder and the applicator head and with reduced, limited or no use of a tool.

SUMMARY

According to one aspect, there is provided a fluid application device having an applicator head, a slot die assembly, and a securing mechanism configured to secure the slot die assembly to the applicator head. The slot die assembly includes a die extruder comprising one or more fluid input ports configured to receive a fluid from the applicator head, a shim positioned adjacent to the die extruder and a plate positioned adjacent to the shim on a side of the shim opposite from the die extruder. The securing mechanism includes a securing component at one of the applicator head and the slot die assembly, and a corresponding and/or cooperating securing component at the other of the applicator head and slot die assembly.

According to another aspect, there is provided a slot die assembly for discharging fluid from a fluid application device. The slot die assembly includes a die extruder having one or more fluid input ports configured to receive a fluid and a first engaging surface configured to engage a corresponding first support surface on an applicator head of a fluid application device, a shim positioned adjacent to the die extruder, and a plate positioned adjacent to the shim on a side of the shim opposite from the die extruder. The plate includes a second engaging surface configured to engage a second support surface on the applicator head.

According to still another aspect, there is provided a fluid application device having an applicator head and a slot die assembly. The slot die assembly includes a die extruder comprising one or more fluid input ports configured to receive a fluid from the applicator head, a shim positioned adjacent to the die extruder, and a plate positioned adjacent to the shim on a side of the shim opposite from the die extruder. The fluid application device also includes a securing mechanism configured to secure the slot die assembly to the applicator head, the securing mechanism having an end mounted securing component disposed on at least one end of the applicator head or the slot die assembly, and an end mounted corresponding securing component disposed on at least one end of the other of the applicator head or slot die assembly.

In another aspect, there is provided a fluid application device having an applicator head including a fastening bolt secured thereto, the bolt having a shank extending outwardly from the applicator head, the shank having a head disposed at one end, and a slot die assembly. The slot die assembly includes a die extruder having one or more fluid input ports configured to receive a fluid from the applicator head. The die extruder includes a slot configured to receive the shank and a shoulder configured to be engaged by the head of the shank. The slot die assembly also includes a shim positioned adjacent to the die extruder and a plate positioned adjacent to the shim on a side of the shim opposite from the die extruder.

These and other features and advantages of the present invention will be apparent from the following detailed description, in conjunction with the appended claims.

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 2:
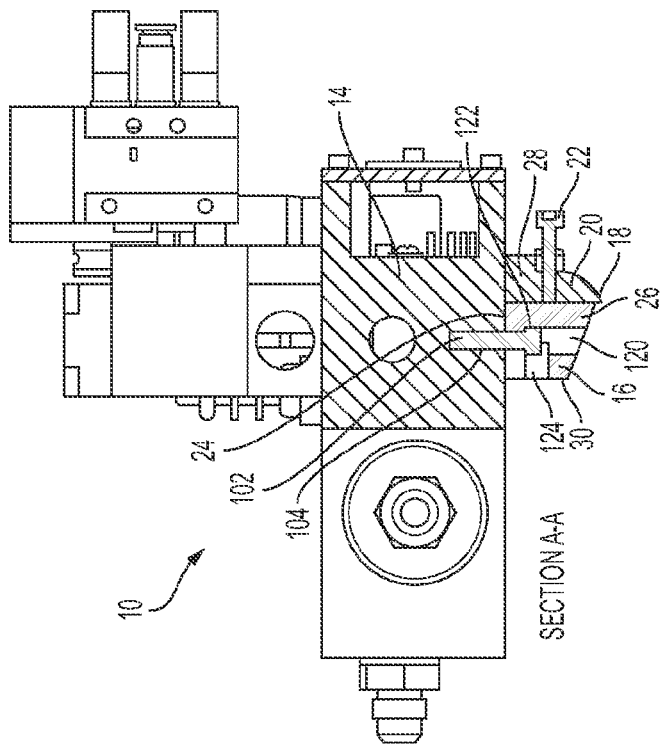
FIG. 2 is a cross-sectional view of the fluid application device and slot die assembly of FIG. 1.
Figure 1:
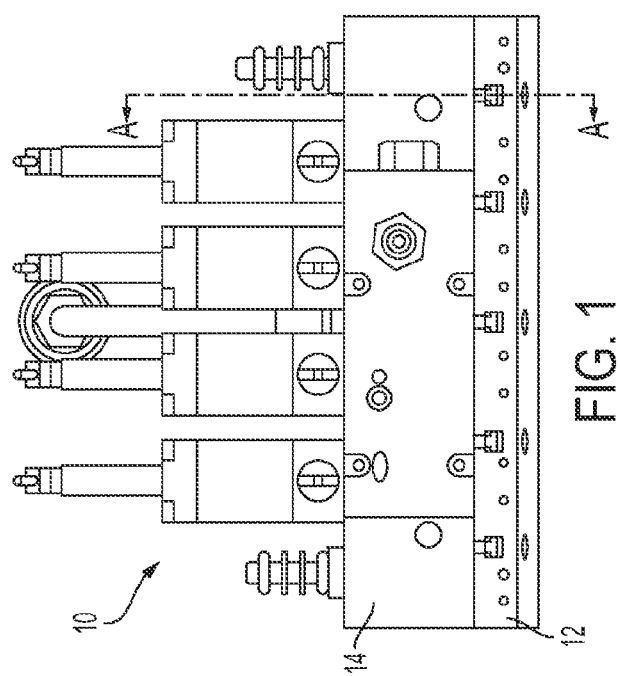
FIG. 1 is a rear view of a fluid application device having a slot die assembly according to one embodiment.

FIG. 1 is a rear view of a fluid application device 10 having a slot die assembly 12 installed on an applicator head 14, according to one embodiment. FIG. 2 is a cross-sectional view of the fluid application device 10 and slot die assembly 12 of FIG. 1. Referring to the examples in FIGS. 1 and 2, the fluid application device 10 includes an applicator head 14. The applicator head 14 may include, or be formed as, an adapter to which the slot die assembly 12 is removably secured or installed.

Generally, in the embodiments described herein, the slot die assembly 12 may be affixed to the applicator head 14 using a suitable securing mechanism. The securing mechanism may include, for example, a securing component formed on or affixed to the slot die assembly 12 or the applicator head 14, and a corresponding, mating and/or cooperating securing component formed on or affixed to the other of the slot die assembly 12 or the applicator head 14. The securing component is configured to releasably engage the corresponding securing component to releasably affix the slot die assembly 12 to the applicator head 14.

Figure 4:
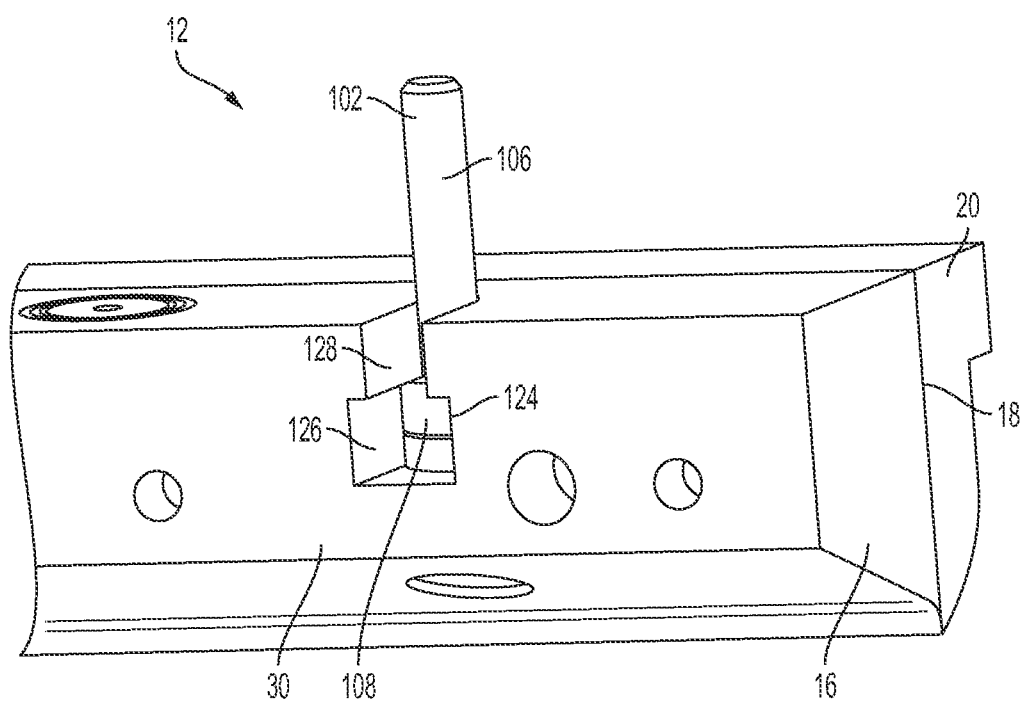
FIG. 4 is a rear perspective view of a portion of the slot die assembly of FIG. 1.

For example, in one embodiment, as shown in FIG. 2, the securing component may include one or more fasteners 102 positioned in, and extending outwardly from, respective bores 104 of the applicator head 14. In one example, each fastener 102 is formed having an elongated shank 106 and a head 108 integral with the shank 106 (FIG. 4). The fasteners 102 may be, for example, bolts 102 that are threadably received in the applicator head 14. However, it is understood that the present disclosure is not limited to this example, and other suitable fasteners may be used as well.

Referring to FIG. 2, the slot die assembly 12 includes a die extruder 16, a shim 18 and a plate 20. The shim 18 is positioned adjacent to the die extruder 16, and the plate 20 is positioned adjacent to the shim 18 on a side of the shim 18 opposite from the die extruder 16. The die extruder 16, shim 18, and plate 20 may be secured together using a suitable fastener, such as a bolt 22. In one embodiment, the die extruder 16 includes a first surface 24 configured for abutting engagement with the applicator head 14 and a second surface 26 positioned at a side of the die extruder 16 opposite from the first surface 24. The die extruder 16 further includes a third surface 28 extending between the first surface 24 and second surface 26 and configured to abut the shim 18, and a fourth surface 30 extending between the first surface 24 and second surface 26 and positioned at a side of the die extruder 16 opposite from the third surface 28. In one embodiment the first surface 24 may correspond to an upper surface of the die extruder 16, the second surface 26 may correspond to a lower surface of the die extruder 16, the third surface 28 may correspond to a front surface of the die extruder 16, and the fourth surface 30 may correspond to a rear surface of the die extruder 16.

Still referring to FIG. 2, the corresponding or mating securing component may be formed as a slot in the die extruder 16 having a fastening bore or slot 120 extending in a longitudinal direction. In one embodiment, the fastening bore 120 extends from the first surface 24 to the second surface 26 and includes a shoulder 122 formed therein. The shoulder 122 is configured to engage the head of the fastener 102 for securing the die extruder 16, and in turn, the slot die assembly 12, to the applicator head 14.

The slot, i.e., the corresponding or mating securing component, may further include an insertion bore or slot 124 formed in the die extruder 16, positioned adjacent to and in communication with the fastening bore 120. In one embodiment, the insertion bore 124 may be open to and extend inwardly form the fourth surface 30. Accordingly, with the fastener 102 positioned in the insertion bore 124, the die extruder 16 may be moved relative to the fastener 102 such that the fastener 102 is received in the fastening bore 120 from the insertion bore 124. That is, the die extruder 16 may be moved in a lateral, i.e., transverse, direction relative to the fastener 102 (or the longitudinal direction), so that the fastener 102 is positioned in the fastening bore 120.

Figure 3:
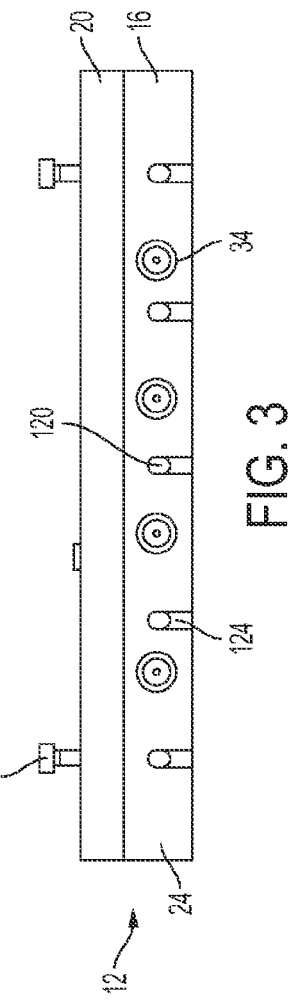
FIG. 3 is a top view of the slot die assembly of FIG. 1.

FIG. 3 is a top view of the slot die assembly of FIG. 1, according to one embodiment. Referring to FIG. 3, the die extruder 16 further includes one or more fluid input ports 34 configured to receive a fluid from the applicator head 14. The fluid input ports 34 may be fluidically connected to one or more internal conduits (not shown) formed in the die extruder 16. One or more discharge slots (not shown) may be defined at the in shim 18, each discharge slot fluidically connected to the internal conduit or conduits. The plate 20 serves as a backing plate. Accordingly, a fluid may be received in the slot die assembly 12 through the one of fluid input ports 34 and flow to the internal conduit. The fluid may be received in the one or more discharge slots from the internal conduit, and in turn, be discharged from the slot die assembly 12 onto a substrate, for example, a strand of material.

With further reference to FIG. 3, and as detailed above, the fastening bore 120 may extend through the die extruder 16 from the first surface 24 to the second surface 26. In addition, the insertion bore 124 may extend inwardly from the fourth surface 30, and be in communication with the fastening bore 120.

FIG. 4 is a rear perspective view of a portion of the slot die assembly 12 of FIG. 1, according to one embodiment. Referring to FIG. 4, the insertion bore 124 extends inwardly from the fourth surface 30. In addition, the insertion bore 124 may be sized and dimension to receive the desired fastener 102. For example, the insertion bore 124 may include first section 126 and a second section 128 in communication with the first section 126. The first section 126, in one embodiment, has a larger width than the second section 128. Accordingly, the head 108 of the fastener 102 may be received in the first section 126, and the shank 106 may be received in the second section 128. The die extruder 16 may be supported by the head 108 of the fastener 102 at the junction of the first section 126 and the second section 128 in the insertion bore 124, or at the shoulder 122 formed in the fastening bore 120.

In use, according to one embodiment, the head 108 of the fastener 102 may be aligned with the first section 126 of the insertion bore 124, and the shank 106 of fastener 102 may be aligned with the second section 128 of the insertion bore 124. The die extruder 16 may be moved in a direction so that the fastener 102 is brought into the insertion bore 124. The die extruder 16 may be moved further in the same direction so that the fastener 102 is received fastening bore 120 from the insertion bore 124. In one example, the fastening bore 120 and/or the fastener 102 define a longitudinal direction. The slot die assembly 12, when moved to bring the fastener 102 into the fastening bore 120, is moved in a direction substantially transverse to the longitudinal direction. With the fastener 102 in the fastening bore 120, the fastener 102 may be operated to secure the die extruder 16 to the applicator head 14. For example, the fastener 102 may be a threaded fastener and may be operated by rotating the fastener 102 by hand or with an appropriate tool (not shown). An operator may access the fastener 102 in the fastening bore 120 through the second surface 26 of the die extruder 16, and rotate the fastener 102 to exert a clamping force between the head 108 of the fastener 102 and the shoulder 122 in the fastening bore 120 to bring the first surface 24 into engagement with the applicator head 14 and secure the slot die assembly 12 to the applicator head 14.

To remove the slot die assembly 12, an operator may only partially remove the fastener 102. For example, with a threaded fastener 102, the operator may rotate each fastener 102 until a sufficient amount of clamping force is released to facilitate removal of the slot die assembly 12 from the applicator head 14, while the leaving the fasteners 102 still secured in the applicator head 14.

In the embodiments above, it is understood that the number, position, size and type of fastener 102 may be varied during manufacturing and/or assembly to be adapted for specific uses. For example, while FIG. 1 shows five insertion bore 124/fastening bore 120 arrangements across a rear side 30 of the die extruder 16, with a fastener 102 received in each, it is understood that the fluid application device 10 may be formed with only two insertion bore 124/fastening bore 120 arrangements, positioned, for example, at or near opposite ends of the slot die assembly 12. An additional one or more insertion bore 124/fastening bore 120 arrangements could also be included at intermediate positions along the slot die assembly 12. In one example, two additional intermediate fastener arrangements may be used, and the additional intermediate fastener arrangements may be positioned closer to a vertically extending centerline than to the fasteners at or near the opposite ends of the slot die assembly 12. In some embodiments, the fastener 102 may be a hex bolt, or a socket type hex bolt, and could be for example, an M6 or M8 sized bolt.

FIGS. 5-8 show various views of an alternative embodiment of the die extruder 16. It is understood further descriptions of the features described in the embodiments above that are similar or identical to features in the embodiments below may be omitted. It is further understood that the features described in the embodiments below may be incorporated in, or used together with, the embodiments described above, and vice versa. Further, similar reference numbers may be used below where the features are the same or similar as the features described above. Further still, where terminology and/or reference numbers used below are the same as the terminology and/or reference used above, it is understood that the features associated with the terminology below may be the same or similar as the features described above unless described differently below.

Figure 6:
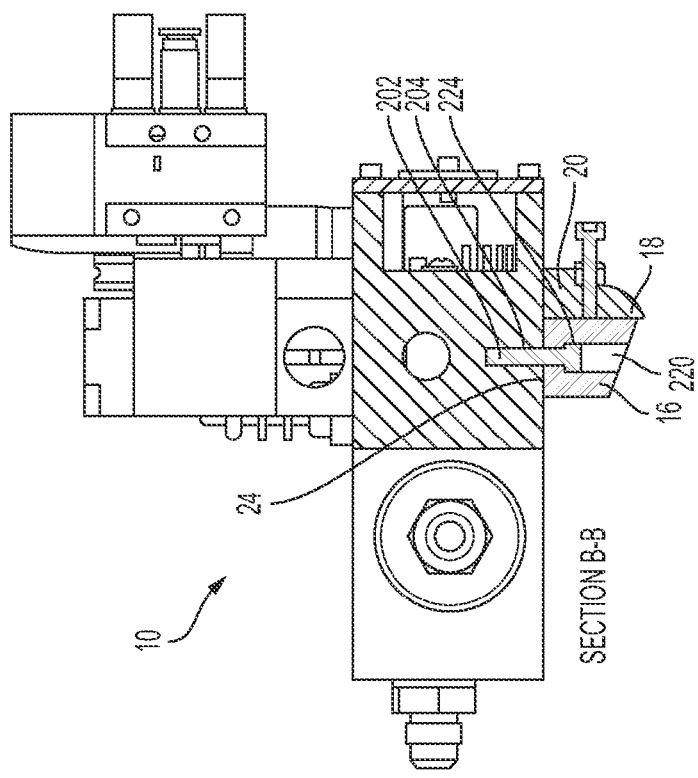
FIG. 6 is a cross-sectional view of the fluid application device and slot die assembly of FIG. 5.
Figure 7:
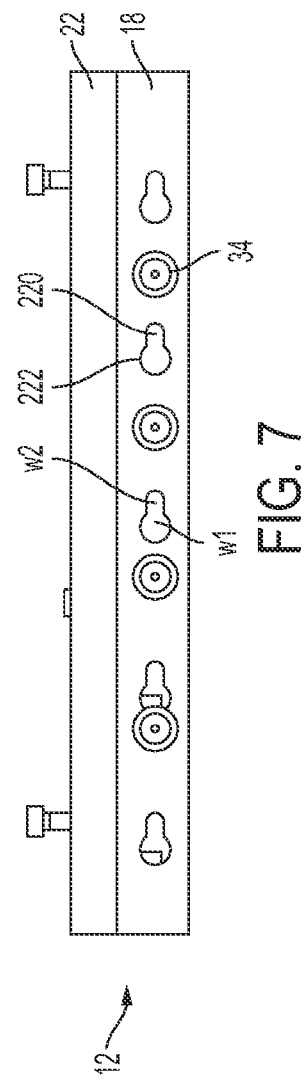
FIG. 7 is a top view of the slot die assembly of FIG. 5.
Figure 5:
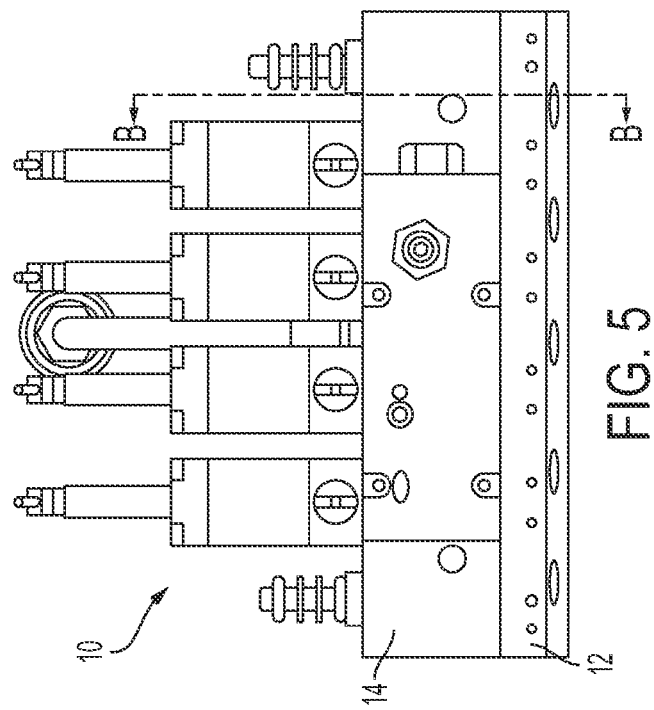
FIG. 5 is a rear view of a fluid application device having a slot die assembly according to another embodiment.

FIG. 5 is a rear view of the fluid application device 10 having a slot die assembly 12 according to another embodiment. FIG. 6 is a cross-sectional view of the fluid application device 10 and slot die assembly 12 of FIG. 5. FIG. 7 is a top view of the slot die assembly 12 of FIG. 5. Referring to example shown in FIGS. 5-7, the securing component may include one or more fasteners 202 positioned in, and extending outwardly from, respective bores 204 of the applicator head 14. The one or more fasteners 202 may be the same as similar to the fasteners 102 described in the embodiment above. The corresponding or mating securing component may be a slot formed generally as a keyhole slot. For example, the keyhole slot may be formed in the die extruder 16 as a fastening bore or slot 220 and an insertion bore or slot 222 having a configuration different from the examples described above. As shown in FIG. 7, for example, the fastening bore 220 and insertion bore 222 extend generally parallel to, and in communication with, one another. Both the insertion bore 222 and the fastener 202 may extend inwardly from the first surface 24 of the die extruder 16.

Figure 8:
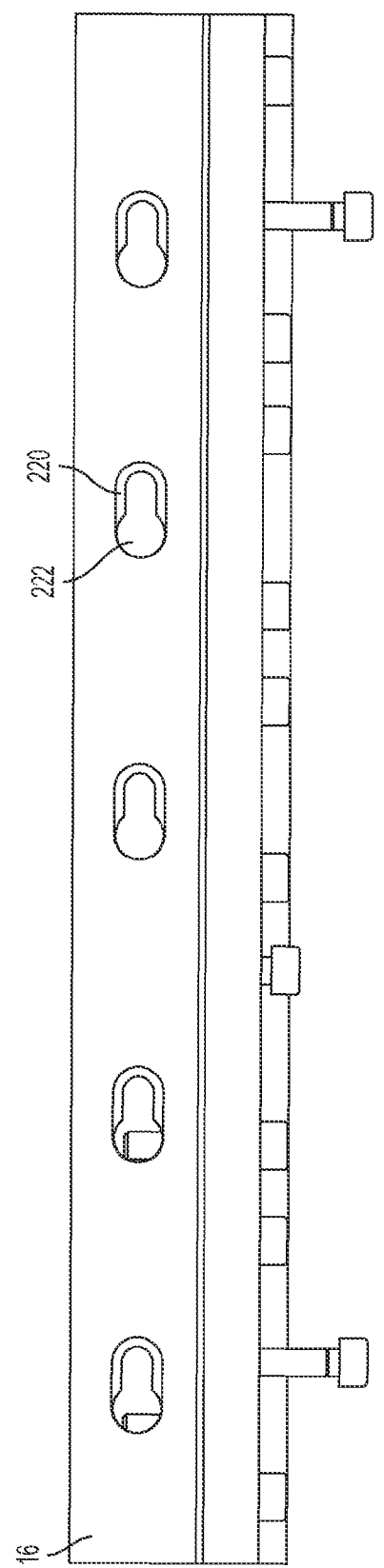
FIG. 8 is a bottom view of a portion of the slot die assembly of FIG. 5.

FIG. 8 is a bottom view of the slot die assembly 12 of FIGS. 5-7. Referring still to FIGS. 5-7, and additionally to FIG. 8, at the first surface 24, the insertion bore 222 may have a first width 'w1' and the fastening bore 220 may have a second width 'w2', wherein the first width 'w1' is greater than the second width 'w2'. In one embodiment, the first width 'w1' is sufficient to receive a head of the fastener 202, while the second width 'w2' is less than the diameter of the head of the fastener 202. The second width 'w2' is sufficient to receive the shank of the fastener 202. As shown in FIG. 6, for example, the fastening bore 220 includes a shoulder 224 configured to engage the head of the fastener 202, thus, the slot die assembly 12 may be supported, at least in part, on the head of the fastener 202.

In use, according to one embodiment, the die extruder 16 may be positioned with the fastener 202 aligned with the insertion bore 222. The die extruder 16 may be moved toward the fastener 202 in a first direction such that the fastener 202 is received in the insertion bore 222 through the first surface 24 of the die extruder 16. When the head of the fastener 202 is clear of the shoulder 224, the die extruder 16 may be moved in a second direction, transverse to the first direction, to bring the fastener 202 into the fastening bore 220 from the insertion slot 222. With the fastener 202 in the fastening bore 220, the head of the fastener 202 may support the die extruder 16 through engagement with the shoulder 224. The fastener 202 may then be operated as described above to secure the die assembly 12 to, and remove the die assembly 12 from, to the applicator head 14.

In the embodiments above, an operator may install or changeover a slot die assembly 12 without complete removal of the fasteners used to secure the slot die assembly to the applicator head. Rather, in the embodiments above, an operator may "tighten" or "loosen" the fasteners to secure the slot die assembly 12 to, or remove the slot die assembly 12 from the applicator head 14, respectively. Accordingly, because the fasteners need not be completely removed, time and labor savings may be achieved.

Figure 9:
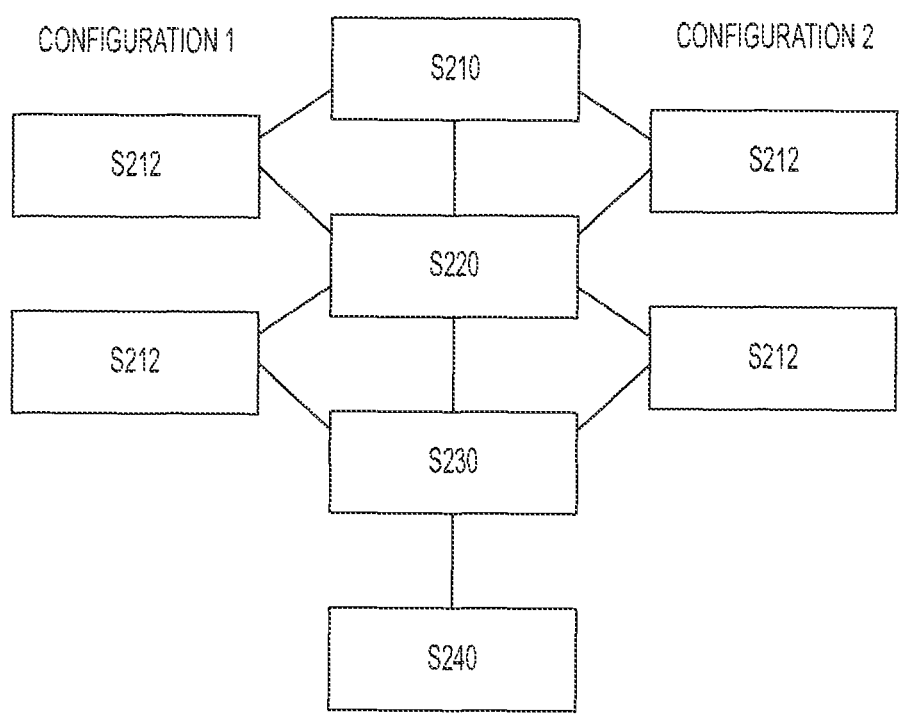
FIG. 9 is a diagram showing a method of removably installing a slot die assembly on an applicator head of a fluid application device according to one embodiment described herein.

FIG. 9 is a diagram showing an example of a method for removably installing a slot die assembly 12 described in the embodiment s above on an applicator head 14 of a fluid application device 10. The method includes, at S210, positioning the die extruder 16 relative to the fastener 102, 202 such that the fastener 102, 202 is received in the insertion bore 124, 222. At S220, the method includes sliding the die extruder 16 relative to the fastener 102, 202 such that the fastener 102, 202 is received in the fastening bore 120, 220. At S230, the method includes operating the fastener 102, 202 to secure the die extruder 16 to the applicator head 14. At S240, the method may further include operating the fastener 102, 202 to release the die extruder 16 from the applicator head 14 by partially removing the fastener 102, 202.

In one configuration, as shown at S212, positioning the die extruder 16 includes moving the die extruder 16 in a first direction relative to the fastener 202 such that the fastener 202 is received in the insertion bore 222 and sliding the die extruder 16, as shown at S222, includes moving the die extruder 16 in a second direction, different from the first direction.

In another configuration, as shown at S214, positioning the die extruder 16 includes moving the die extruder 16 in a first direction relative to the fastener 102 such that the fastener 102 is received in the insertion bore 124, and sliding the die extruder 16, as shown at S224, includes moving the die extruder 16 further in the first direction.

Figure 10:
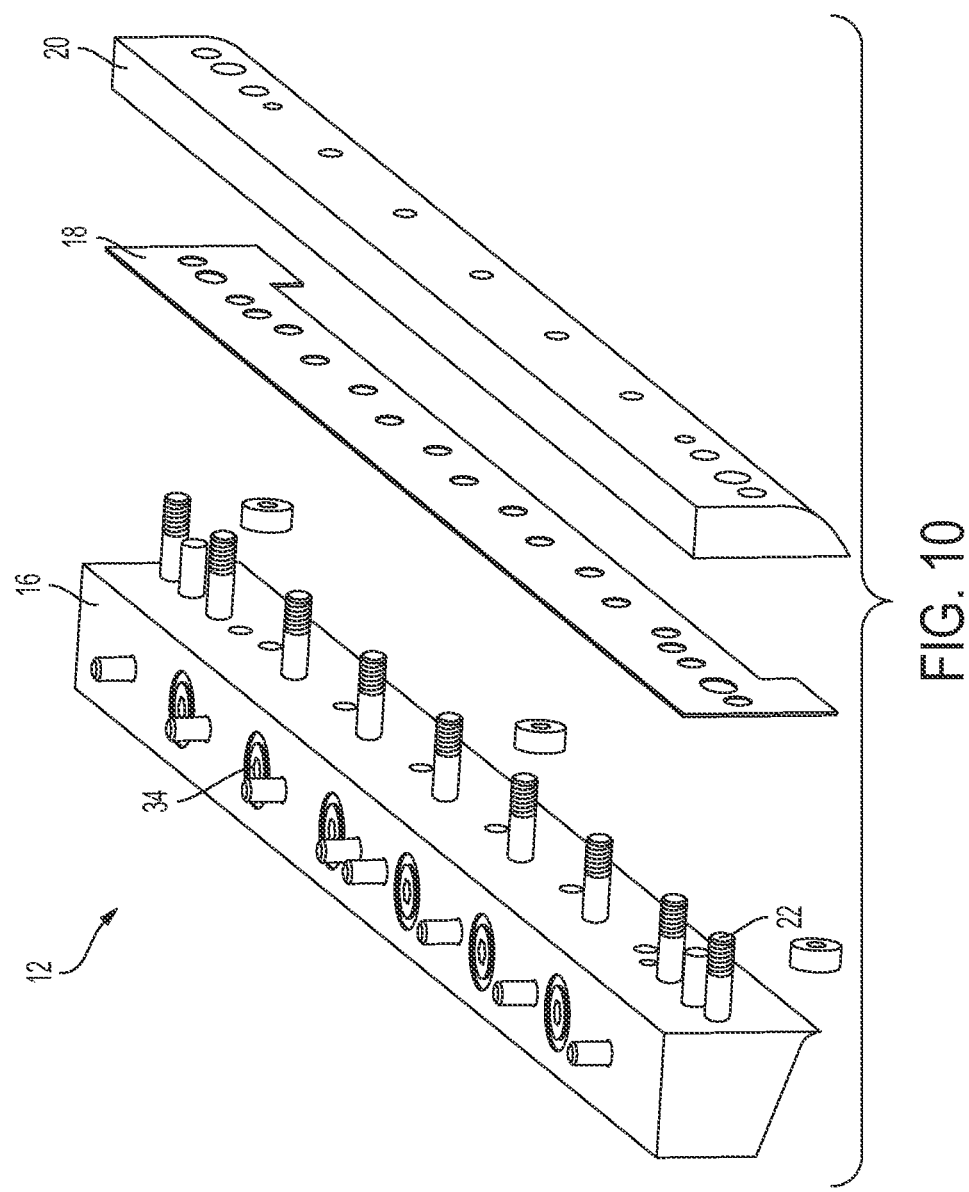
FIG. 10 is an exploded view of a slot die assembly having interchangeable shim and/or plate according to one embodiment.

FIG. 10 is an exploded view of the slot die assembly 12. Referring to FIG. 10, the shim 18 and plate 20 may be interchangeably mounted on the die extruder 16. For example, the die assembly fastener 22, in one embodiment, may be secured in the die extruder 16. The shim 18 and plate 20 may include corresponding, aligned openings through which the die assembly fastener 22 is configured to extend. Optionally, the die assembly fastener 22 includes a threaded portion at an end distal, or opposite to the die extruder 16. A nut, such as a slip nut or lock nut may be positioned on the threaded portion of the die assembly fastener 22. In one embodiment, the slot die assembly 12 includes a plurality of die assembly fasteners 22.

In use, according to one embodiment, the shim 18 and plate 20 may be positioned so that the die assembly fastener 22 extends through the aligned, corresponding openings, slidably moved along the die assembly fastener 22 into position where the shim 18 abuts the die extruder 16, and the plate 20 abuts the shim 18. The nut may then be used to secure the shim 16 and plate 18 in position.

To remove or replace the shim 18 or plate 20, an operator may remove the nut so that the plate 20 and shim 18 may be slidably removed along the die assembly fastener 22, while the die assembly fastener 22 is maintained on the die extruder 16. Accordingly, the shim 18 and/or plate 20 may be removed or replaced without completely removing the die assembly fastener 22.

Figure 11:
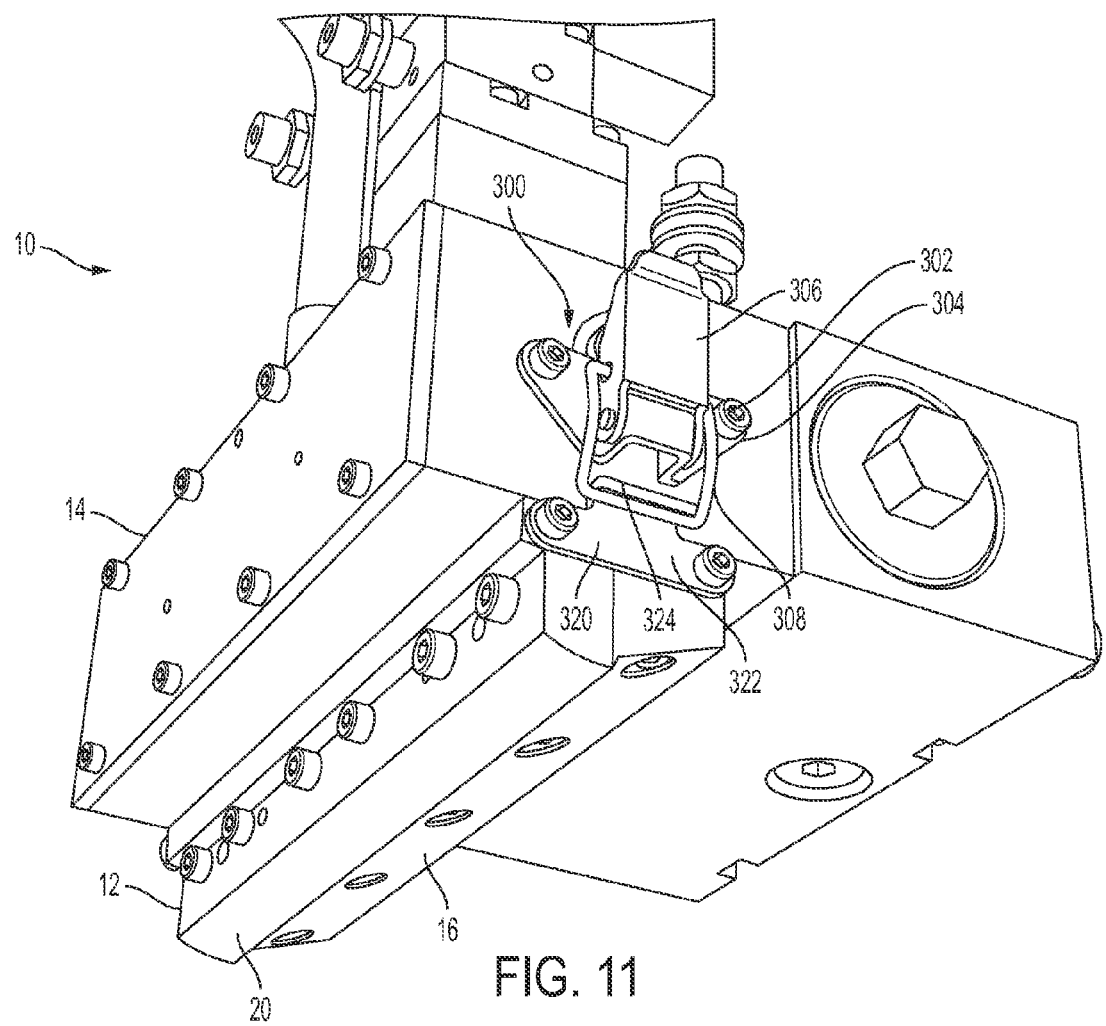
FIG. 11 is a perspective view of a fluid application device according another embodiment described herein.

FIG. 11 is a perspective view of a fluid application device 10 according to another embodiment described herein. Referring to FIG. 11, the securing mechanism for affixing the slot die assembly 12 to the applicator head 14 is a tension lock 300 comprising, generally, a securing component formed as a latch 302 and a corresponding securing component formed as a catch 320. In one embodiment, the latch 302 is secured to the applicator head 14. The latch 302 may include a bracket 304 secured to the applicator head 14, a latch handle 306 rotatably mounted to the bracket 304, and a latching hook 308 rotatably mounted on the latch handle 306. The latch handle 306 is rotatable about a first axis and the latching hook 308 is rotatable about a second axis spaced from the first axis. In this embodiment, the securing component 302 and corresponding securing component 320 may be end mounted on the slot die assembly 12 and the applicator head 14.

The corresponding securing component, or catch 320, may include a bracket 322 secured to the slot die assembly 12. The bracket 322 includes a lip 324 formed thereon and secured to the slot die assembly 12. The latching hook 308 is configured to selectively engage the lip 324 to secure the slot die assembly 12 to the applicator head 14.

In use, the tension lock 300 may be actuated between an unlocked condition and a locked condition. In one embodiment, in the unlocked condition, the latch handle 306 is rotated in a first direction toward a side of the applicator head 14 on which the slot die assembly 12 is to be positioned. In this unlocked condition, a tension or clamping force from the tension lock 300 is released from the slot die assembly 12. To lock the tension lock 300, the latching hook 308 is received in the lip 324, and the latch handle 306 is rotated in a second direction, opposite to the first direction, away from the side of the applicator head 14 on which the slot die assembly 12 is to be positioned. The rotation of the latch handle 306 in the second direction, with the latching hook 308 engaged in the lip 324, brings the slot die assembly 12 toward, and into contact with, the applicator head 14. Continued rotation of the latch handle 306 in the second direction, to the locked condition, applies a clamping force to the slot die assembly 12, via the latching hook 308 and the lip 324, to secure the slot die assembly 12 on the applicator head 14.

The fluid application 10 may include, for example, two tension locks 300. Each tension lock 300 may be positioned at a respective lateral side or end of the applicator head 14 and slot die assembly 12. The brackets 304 and 322 of the latch 302 and catch 320, respectively, may be secured to the respective applicator head 14 and slot die assembly 12 with known fasteners, such as, but not limited, bolts. Additionally, it us understood that in an alternative arrangement, the latch 302 may be secured to the slot die assembly 12 and the catch 320 may be secured to the applicator head 14. Further still, at least two positioning pins (not shown) may be included on the slot die assembly 12, the applicator head 14, or a combination thereof, for proper positioning of the slot die assembly 12 on the applicator head 14.

Figure 12:
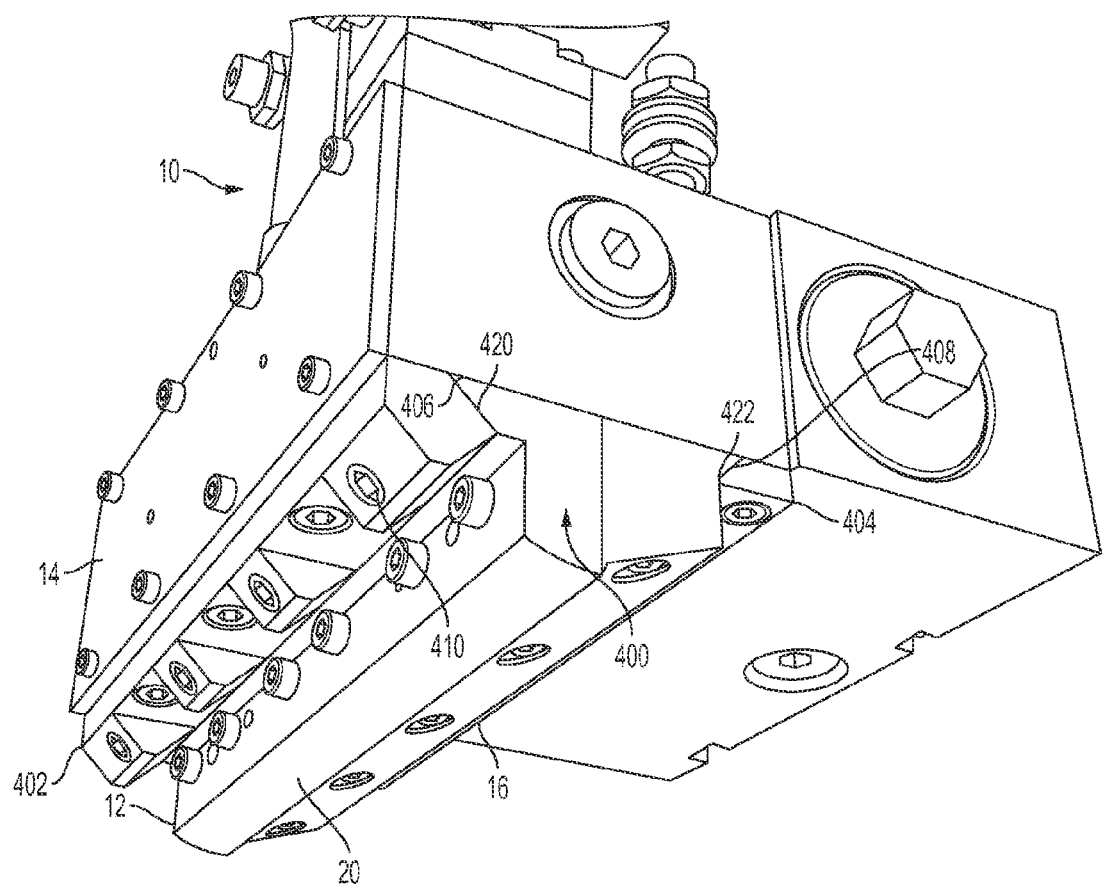
FIG. 12 is a perspective view of a fluid application device according another embodiment described herein.

FIG. 12 is a perspective view of the fluid application device 10 according to another embodiment described herein. Referring to FIG. 12, the securing mechanism is formed generally as a cooperating dovetail, such as a side load dovetail 400. The securing component includes a first dovetail block 402 secured to the applicator head 14 and a second dovetail block 404 secured to the applicator head 14, spaced apart from the first dovetail block 402. The first dovetail block 402 includes a first support surface 406 and the second dovetail block 404 includes a second support surface 408. The first dovetail block 402 and second dovetail block 404 are configured to receive the slot die assembly 12 therebetween.

The corresponding or mating securing component is formed as a first engaging surface 420 on the die plate 20 and a second engaging surface 422 on the die extruder 16. The first engaging surface 420 is configured to engage the first support surface 406 and the second engaging surface 422 is configured to engage the second support surface 408. In one embodiment, the first engaging surface 420 and first support surface 406 may be formed as complimenting angled surfaces. Similarly, the second engaging surface 422 and second support surface 408 may be formed as complimenting angled surfaces.

The first and second support surfaces 406, 408 are configured to support the slot die assembly 12 via the first and second engaging surfaces 420, 422, respectively. The slot die assembly 12 may be secured in a desired position by tightening one or more fasteners 410 extending through one of the first dovetail block 402 or second dovetail block 404 to engage a corresponding engaging surface 420, 422 of the slot die assembly 12 and apply a clamping force thereto. The one or more fasteners 410 may be, for example, a bolt, and in one embodiment, may be a hex bolt or socket hex bolt. The one or more fasteners 410 may be inserted through a surface of the first or second dovetail block 402, 404 that is angled away from the slot die assembly 12 so as to avoid or reduce interference from a fluid discharged from the slot die assembly 12.

Figure 13:
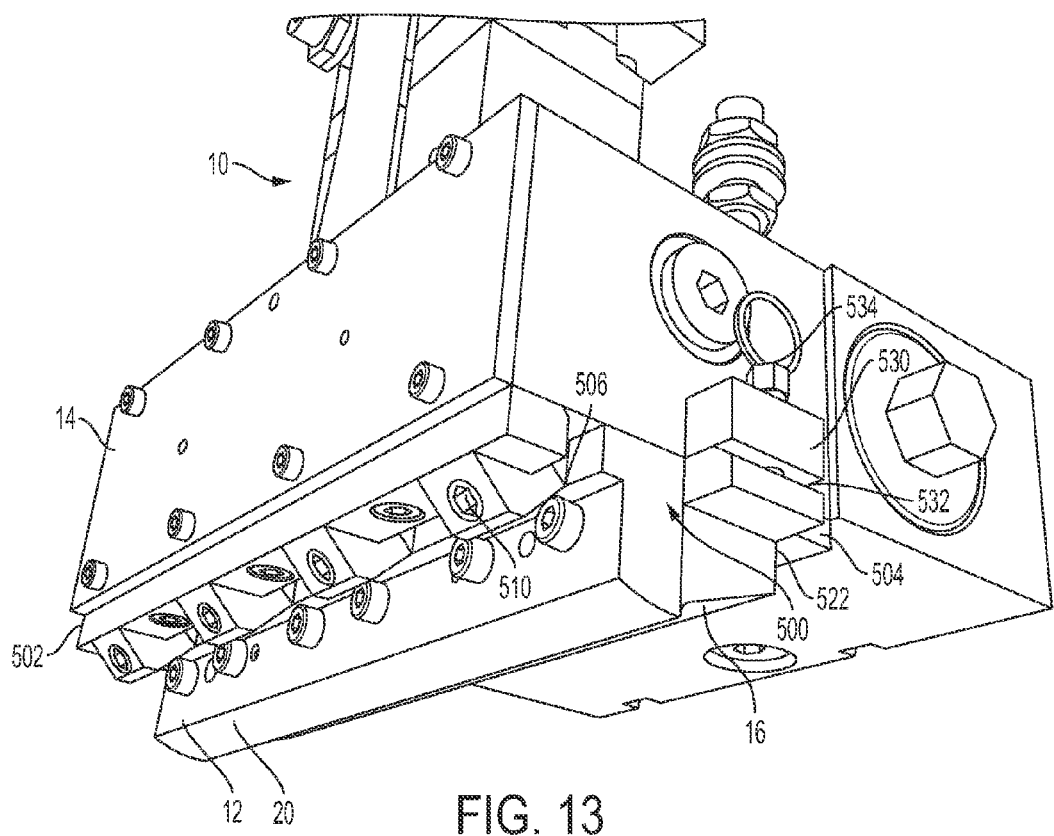
FIG. 13 is a perspective view of a fluid application device according another embodiment described herein.
Figure 14:
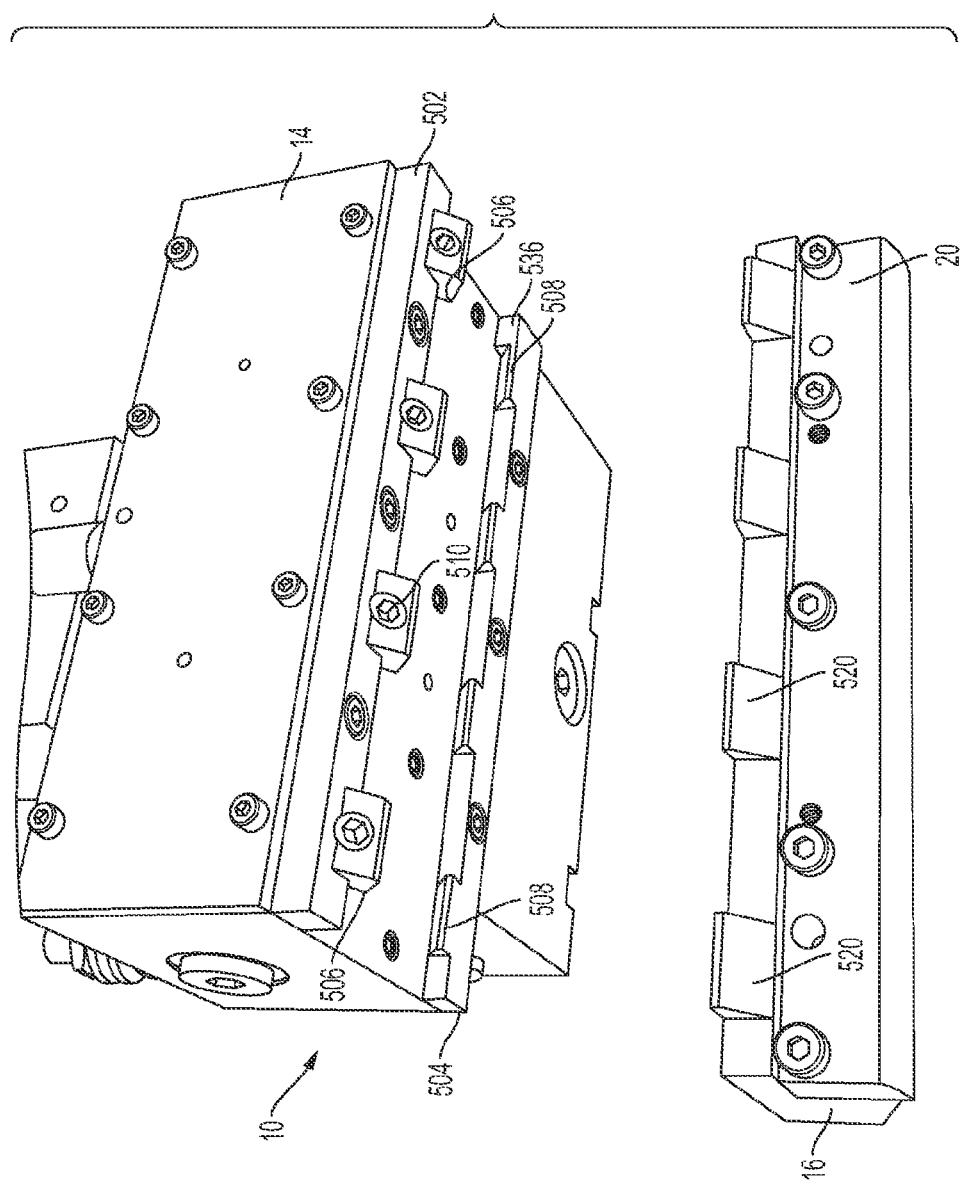
FIG. 14 is a perspective view of the fluid application device of FIG. 13 in a partially disassembled condition.

FIG. 13 is a perspective view of a fluid application device 10 according to another embodiment described herein. FIG. 14 is a bottom perspective view of the fluid application device 10 of FIG. 13, in a partially disassembled condition. Referring to FIGS. 13 and 14, the securing mechanism for affixing the slot die assembly 12 to the applicator head 14 may be another cooperating dovetail, such as a front load dovetail 500. The securing component includes a first dovetail block 502 and a second dovetail block 504 secured to the applicator head 14. The first and second dovetail blocks 502, 504 are spaced apart from one another and are configured to receive the slot die assembly 12 therebetween. The first dovetail block 502 includes a plurality of spaced apart first support surfaces 506 and the second dovetail block 504 includes a plurality of spaced apart second support surfaces 508.

The corresponding or mating securing component is formed as a plurality of first engaging surfaces 520 on the die plate 20 and a plurality of second engaging surfaces 522 on the die extruder 16. Each first engaging surface 520 of the plurality of first engaging surfaces 520 is configured to engage a respective first support surface 506 of the plurality of first support surfaces 506. Similarly, each second engaging surface 522 of the plurality of second engaging surfaces 522 is configured to engage the a respective second support surface 508 of the plurality of second support surfaces 508. In one embodiment, the first engaging surfaces 520 and the first support surfaces 506 may be formed as complimenting angled surfaces. Similarly, the second engaging surfaces 522 and second support surfaces 508 may be formed as complimenting angled surfaces.

In an alternative configuration, the die extruder 16 may be formed generally in an "L" shape rotated so that one leg of the "L" shape extends between the first and second dovetail blocks 502, 504. The die plate 20 may be substantially nested within the general "L" shape of the die extruder 16. The plurality of the first engaging surfaces 520 and the plurality of second engaging surfaces 522 may both be formed on the die extruder 16 at opposite sides of the leg extending between the first and second dovetail blocks 502, 504

The plurality of first and second support surfaces 506, 508 are configured to support the slot die assembly 12 via the plurality of first and second engaging surfaces 520, 522. The slot die assembly 12 may be secured in a desired position by tightening one or more fasteners 510 extending through respective first support surfaces 506 of the plurality of first support surfaces 506, or respective second support surfaces 508 of the plurality of second support surfaces 508 to engage corresponding engaging surfaces 520, 522 of the slot die assembly 12 and apply a clamping force thereto. The one or more fasteners 510 may be, for example, a bolt or a set screw, and in one embodiment, may be a socket or external hex bolt or set screw. The one or more fasteners 510 may be inserted through first or second dovetail block 502, 504 at a position that is angled away from the slot die assembly 12 so as to reduce or avoid interference from a fluid discharged from the slot die assembly 12.

The securing mechanism may further include a positioning mechanism including a first positioning wing 530 secured to the applicator head 14 and a second positioning wing 532 secured to the slot die assembly 12. For example, with further reference to FIGS. 13 and 14, the first positioning wing 530 and second positioning wing 532 may be positioned at a lateral side of the applicator head 14 and slot die assembly 12, respectively. In one embodiment, the second positioning wing 532 may be secured to the die extruder 16 of the slot die assembly 12. A positioning pin 534 may be received in the first positioning wing 530, and extend to a position where at least a portion of the pin 534 is received in the second positioning wing 532, when the slot die assembly 12 is properly positioned. The positioning mechanism may be positioned at one of, or both of the lateral sides of the applicator head 14 and slot die assembly 12. Alternatively, the positioning mechanism may be a stop 536 (FIG. 14) formed at an end of one of or both he first dovetail block 502 and second dovetail block 504.

In use, according to one embodiment, the slot die assembly 12 may be positioned relative to the first and second dovetail blocks 502, 504 with the plurality of first and second engaging surfaces 520, 522 positioned between corresponding support surfaces 506, 508 of the first and second dovetail blocks. The slot die assembly 12 may then be properly positioned by sliding relative to the first and second dovetail blocks 502, 504 until each first and second engaging surface 520, 522 engages a respective first and second support surface 506, 508, and the positioning pin 534 is received in the second positioning wing 532.

Figure 15:
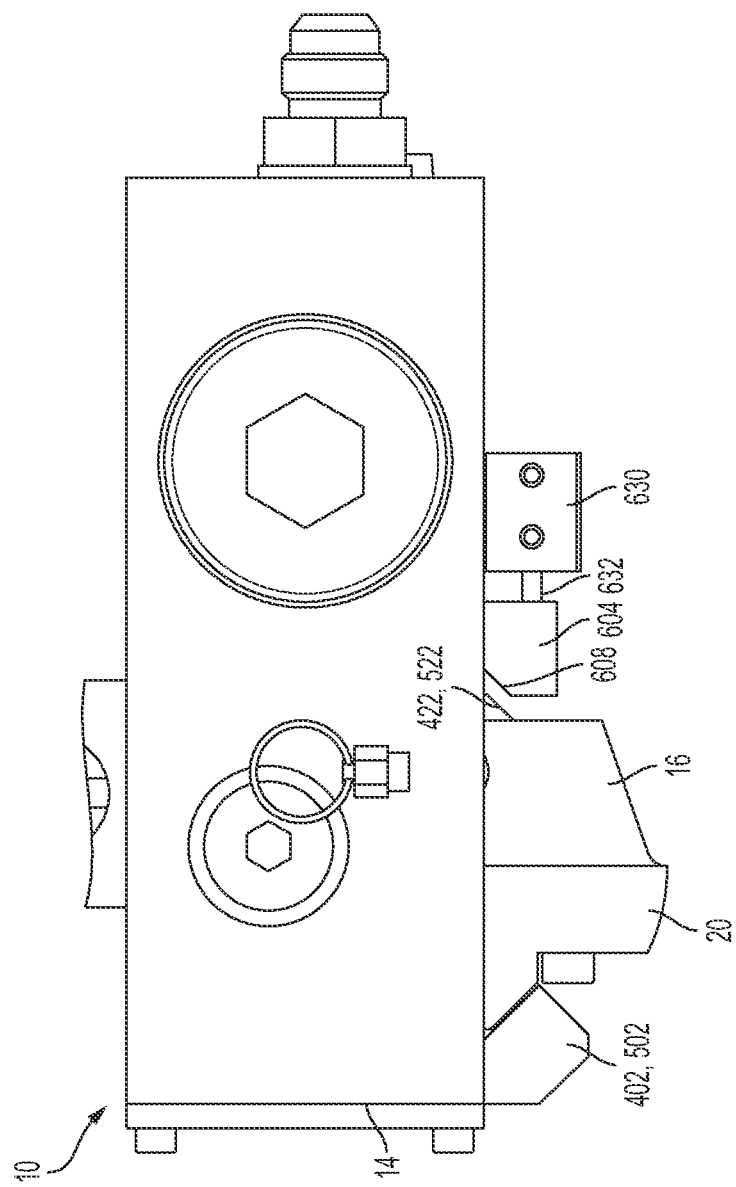
FIG. 15 is a side view of a fluid application device according another embodiment described herein.

FIG. 15 is a side view of the fluid application device 10 according to another embodiment described herein. The securing mechanism in the embodiment of FIG. 15 may be similar to the securing mechanisms described above with reference to the embodiment shown in FIG. 12 and the embodiment shown in FIGS. 13 and 14. It is understood that features of this embodiment that are similar to or the same as features described in the embodiments above with reference to FIGS. 12-14 may be identified with the same reference numbers as those features above, and that further description of these similar or same features may be omitted.

Referring to FIG. 15, the second dovetail block 604 may be slidably positioned relative to the applicator head 14. In one embodiment, the second dovetail block is actuatable between an engaged position and a disengaged position by way of a pneumatic cylinder 630 and rod 632. In the engaged position, the rod 632 is extended from the pneumatic cylinder 630 such that the second support surface 608 may engage the second engaging surface 422, 522 and provide a clamping force to affix the slot die assembly 12 to the applicator head 14. In the disengaged position, the rod 632 is retracted so as to disengage the second support surface 608 from the second engaging surface 422, 522.

Figure 16:
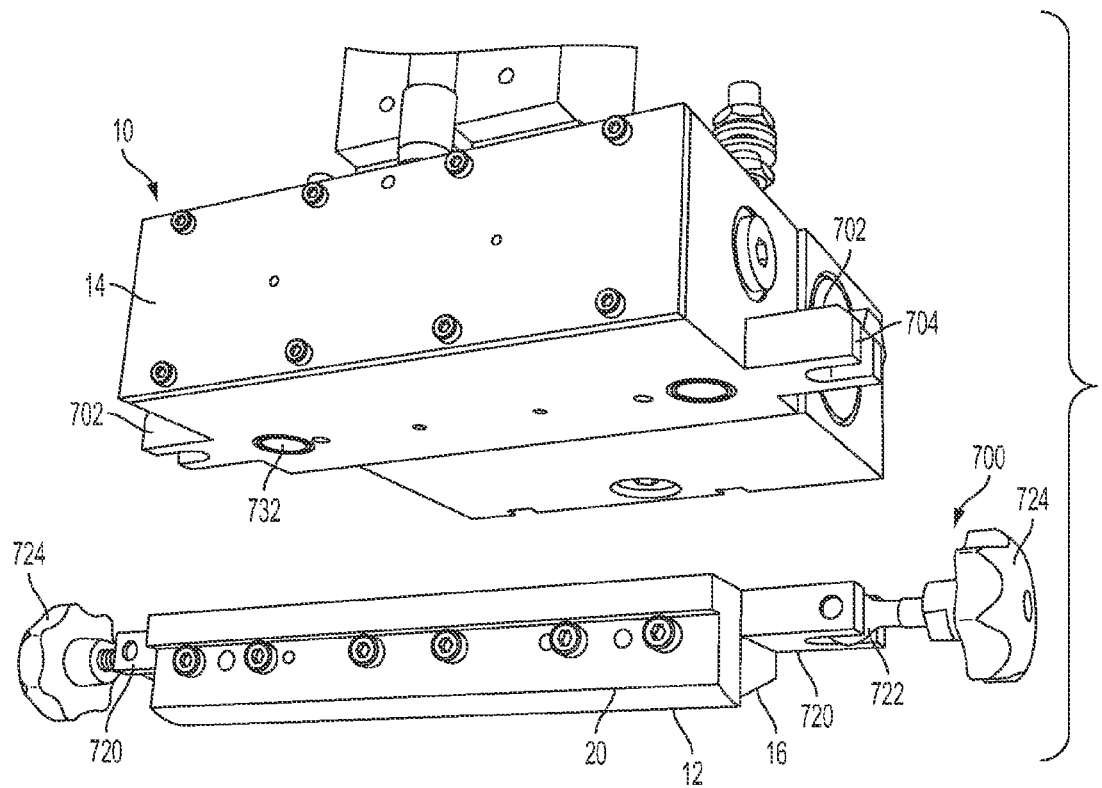
FIG. 16 is a perspective view of a fluid application device, in a partially disassembled condition, according another embodiment described herein.
Figure 17:
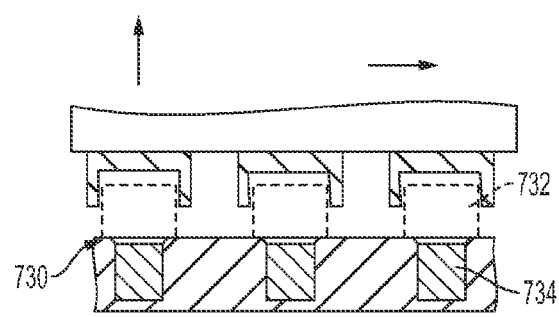
FIG. 17 is a cross-sectional view showing an example of a positioning mechanism in the fluid application device of FIG. 16.

FIGS. 16 and 17 illustrate the fluid application device 10 according to another embodiment. FIG. 16 is a bottom perspective view of the fluid application device 10, in a partially disassembled condition, according to one embodiment. Referring to FIG. 16, the securing mechanism for affixing the slot die assembly 12 to the applicator head 14 may be end mounted and formed generally as a screw clamp assembly 700. The securing component includes a pair of wings 702 extending from opposite sides or ends of the applicator head, each wing 702 having an open slot 704 formed therein. The corresponding or mating securing component is a formed as a pair of slot die assembly wings 720, extending from opposite sides or ends of the slot die assembly 12. In one embodiment, the pair of slot die assembly wings 720 extend from the die extruder 16. Each slot die assembly wing includes an open slot 722 formed therein.

A screw clamp 724 may be rotatably secured in one of the pair of wings 702 or slot die assembly wings 720. For example, as shown in FIG. 16, a screw clamp 724 may be rotatably positioned in each slot die assembly wing 720. Each screw clamp 724 may be rotated between an engaged position and a disengaged for position. For example, referring to FIG. 16, to move the screw clamp 724 to the engaged position, the screw clamp 724 is rotated upwardly toward the applicator head 14 and received in the open slot 704 of the wing 702. The screw clamp 724 may then be rotated about its own longitudinal axis to clamp the slot die assembly 12 to the applicator head. The screw clamp 724 may be moved to the disengaged position by rotating the screw clamp 724 in an opposite direction about its axis, and rotating away from the applicator head 14 such that the screw clamp is removed from the open slot 704 of the wing 702.

Referring to FIGS. 16 and 17, the fluid application device 10 may further include a positioning mechanism 730. In one embodiment, the positioning mechanism is a magnetic positioner. Referring to FIG. 17, the magnetic positioner includes one or more magnetic elements 732 positioned in the applicator head 14 and one or more corresponding magnetic elements 734 positioned in the slot die assembly 12. A magnetic attraction force between the magnetic element 732 and corresponding magnetic element 734 aligns the slot die assembly 12 with the applicator 14 in a proper position so that the die extruder 16 may receive fluid from the applicator head 14. In addition, positioning mechanisms may provide a sufficient attractive holding force to maintain the slot die assembly 12 in the proper position while the slot die assembly 12 is being affixed or secured to the applicator head 14 using any of the securing mechanisms described herein.

Figure 18:
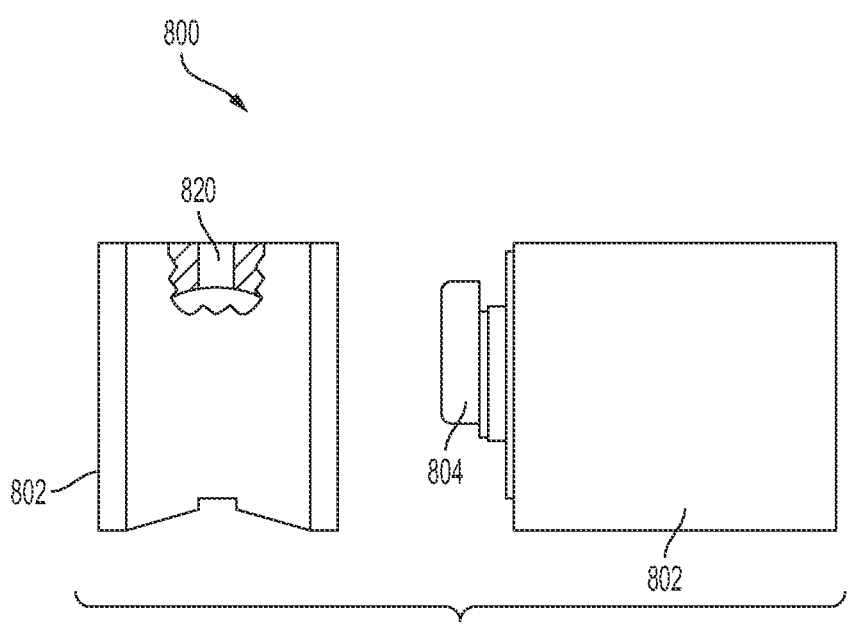
FIG. 18 is a cross-sectional view and side view of the securing mechanism for use in a fluid application device according to another embodiment described herein.

FIG. 18 illustrates an alternative embodiment of a securing mechanism for affixing the slot die assembly 12 to the applicator head 14 of the fluid application device 10. In this embodiment, the securing mechanism may be a magnetic fixation device 800. The magnetic fixation device 800 includes a securing component formed as a housing 802. The housing 802 includes an electro-magnet (not shown) positioned therein. The electro-magnet is actuatable between a magnetized and demagnetized condition. In one embodiment, the housing 802 is operably connected to a switch 804 to actuate the electro-magnet. The housing 802 may positioned in, or secured to either the applicator head 14 or the slot die assembly 12.

The housing 802 is configured to receive a corresponding or mating securing component such a post or pin 820 extending from, and secured to, the other of the applicator head 14 or slot die assembly 12. The post or pin is formed of a magnetic material. Accordingly, with the post or pin 820 received in the housing 802, the electro-magnet may be magnetized to secure the post or pin 820 in the housing 802, thereby securing the applicator head 14 to the slot die assembly 12. Conversely, the electro-magnet may be demagnetized to facilitate removal of the post or pin 820 from the housing 802 such that the applicator head 14 and slot die assembly may be separated.

Figure 19:
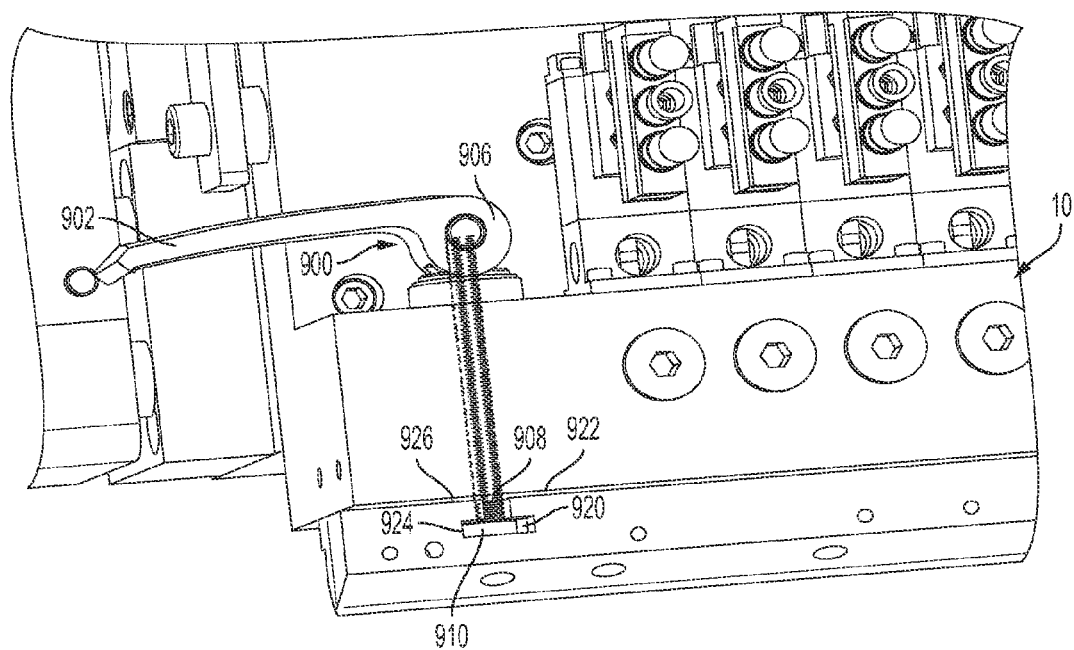
FIG. 19 is a partial perspective view of a fluid application device according another embodiment described herein.

FIG. 19 illustrates the fluid application device 10 according to another embodiment. Referring to FIG. 19, the securing mechanism may be an eccentric cam lever system 900. The cam lever system 900 includes a securing component formed as an eccentric cam lever 902 and a bolt or lug 904 secured to the applicator head 14 at least in part by cam lever system 900. The cam lever 902 is rotatable about an axis and includes an eccentric portion 906 extending around the axis. The cam lever 902 is operably connected to the bolt or lug 904 such that rotation of the cam lever 902 about axis causes the bolt or lug 904 to move linearly. The bolt or lug 904 includes a shank 908 and a head 910 having a greater diameter than the shank 908.

Still referring to FIG. 19, the slot die assembly 12 includes a corresponding or mating securing component formed as an insertion bore or slot 920 and a fastening bore or slot 922 in communication with the insertion bore 920 similar to the insertion bore and fastening bore described in the embodiment above with reference to FIGS. 1-4. However, in this embodiment, compared to the embodiment shown in FIGS. 1-4, the fastening bore 922 does not extend completely through the die extruder 16. The insertion bore 920 is open to one side of the slot die assembly 12 and to the fastening bore 922 at another. Both the insertion bore 920 and the fastening bore 922 include a first portion 924 having a first width, configured to receive the head 910 of the bolt or lug 904, and a second portion 926, in communication with the first portion 924, having a second width and configured to receive the shank 908 of the bolt or lug 904. The first width is greater than the second width so as to form a common shoulder 928 through the insertion bore 920 and fastening bore 922. Accordingly, the head 910 of the bolt or lug 904 may support the slot die assembly 12 at the shoulder 928. Multiple cam lever systems 900, having the securing component and corresponding or mating securing component as described above may be provided. For example, a cam lever system 900 may be provided at or near opposite end of the applicator head 14 and slot die assembly 12.

In operation, according to one example, the slot die assembly 12 may be positioned relative to the applicator head 14 and bolt or lug 904, such that the head 910 is received in the first portion 924 of the insertion slot 920 and the shank 908 is received in the second portion 926. The slot die assembly 12 may then be slid in a first direction relative to the applicator head such that the insertion bore 920 slides relative to the bolt or lug 904 until the bolt or lug abuts a sidewall in the fastening bore 922. The cam lever 902 may then be rotated in a first direction to draw the head 908 of the bolt or lug 904 toward the applicator head 14, such that the head 910 exerts a force on the shoulder 928 to clamp the slot die applicator 12 to the applicator head. Conversely, rotation of the cam lever 902 in the opposite direction causes the head 910 to move away from the applicator head 14 so that the slot die applicator 12 may be released. It is understood that in the embodiments above, the insertion bore and fastening bore may co-extend and/or overlap so form a single bore in which as fastener may be received.

Figure 20:
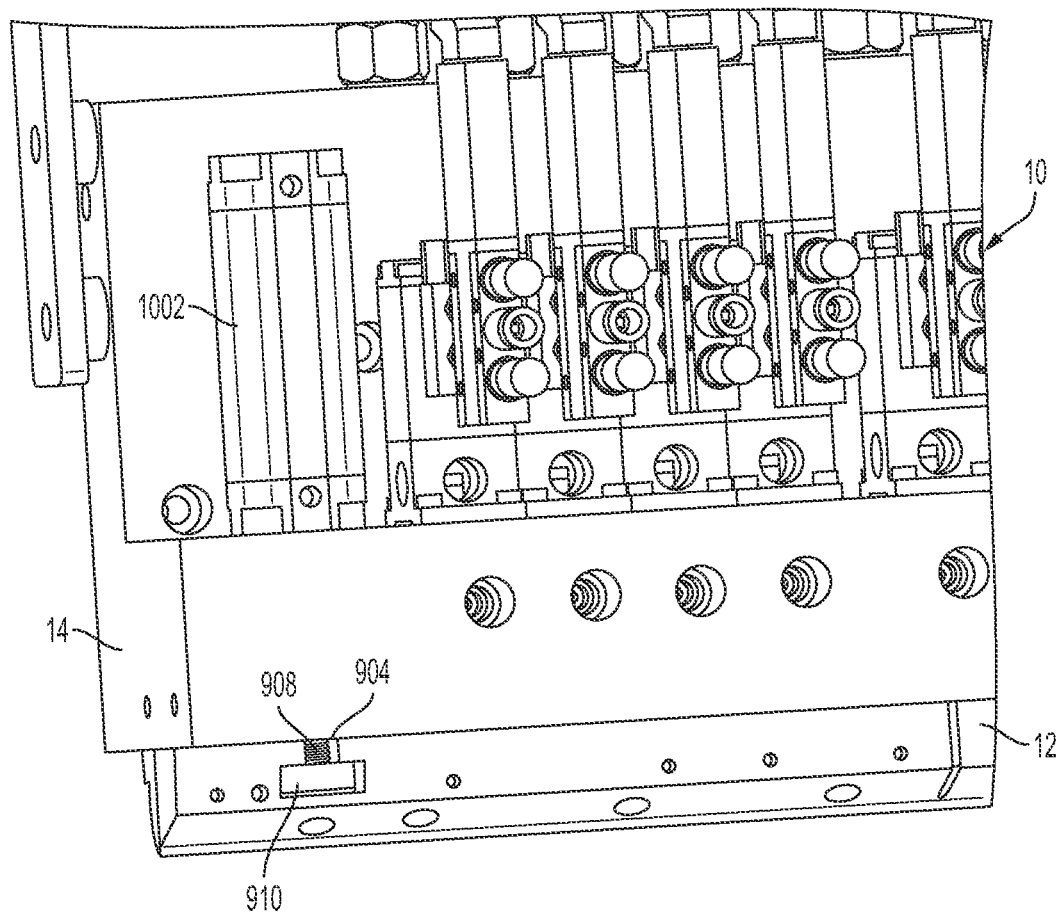
FIG. 20 is a partial perspective view of a fluid application device according another embodiment described herein.

FIG. 20 illustrates another embodiment of the fluid application device 10 shown in FIG. 19. Referring to the embodiment in FIG. 20, the securing component, and in particular, the eccentric cam lever 902 may be replaced with a pneumatic cylinder 1002. That is, in the embodiment shown in FIG. 20, the securing mechanism includes a securing component formed as a pneumatic cylinder 1002, operably connected to the bolt or lug 904 and securing the bolt 904 to the applicator head 14. The pneumatic cylinder 1002 is configured to drive the head 910 of the bolt or lug 904 toward and away from the applicator head 14. In one embodiment, the shank 908 of the bolt or lug 904 may slidably extend within the pneumatic cylinder 1002. Movement of the bolt or lug 904 secures or releases the slot die assembly 12 from the applicator head 14 as described above with reference to FIG. 19. In one embodiment, the fluid application device includes two pneumatic cylinders 1002 positioned at or near opposite sides of the applicator head 14 and slot die assembly 12. The corresponding securing component may be formed as an insertion bore or slot 920 and a fastening bore or slot 922 as described above with reference to FIG. 19.

Figure 21:
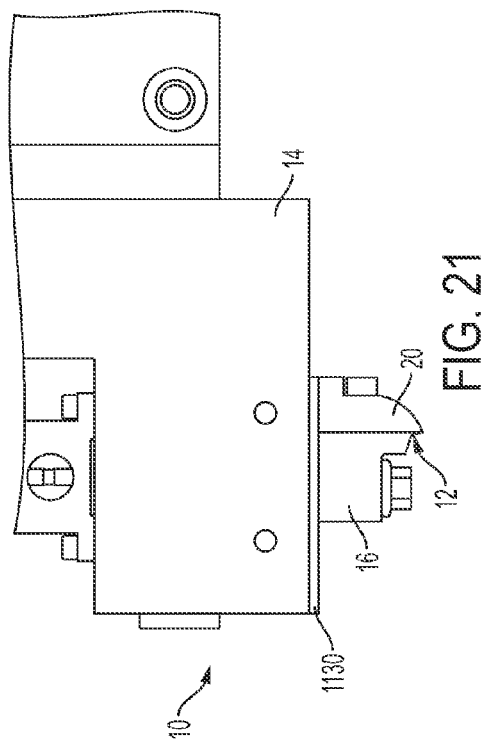
FIG. 21 is a side view of a fluid application device according another embodiment described herein.
Figure 22:
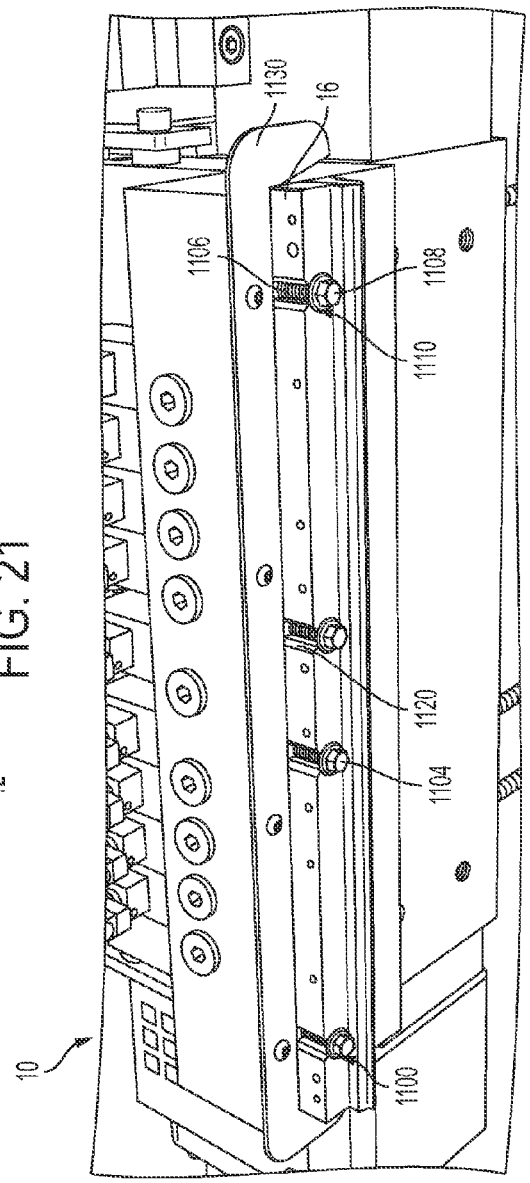
FIG. 22 is a partial perspective view of the fluid application device of FIG. 21.
Figure 23:
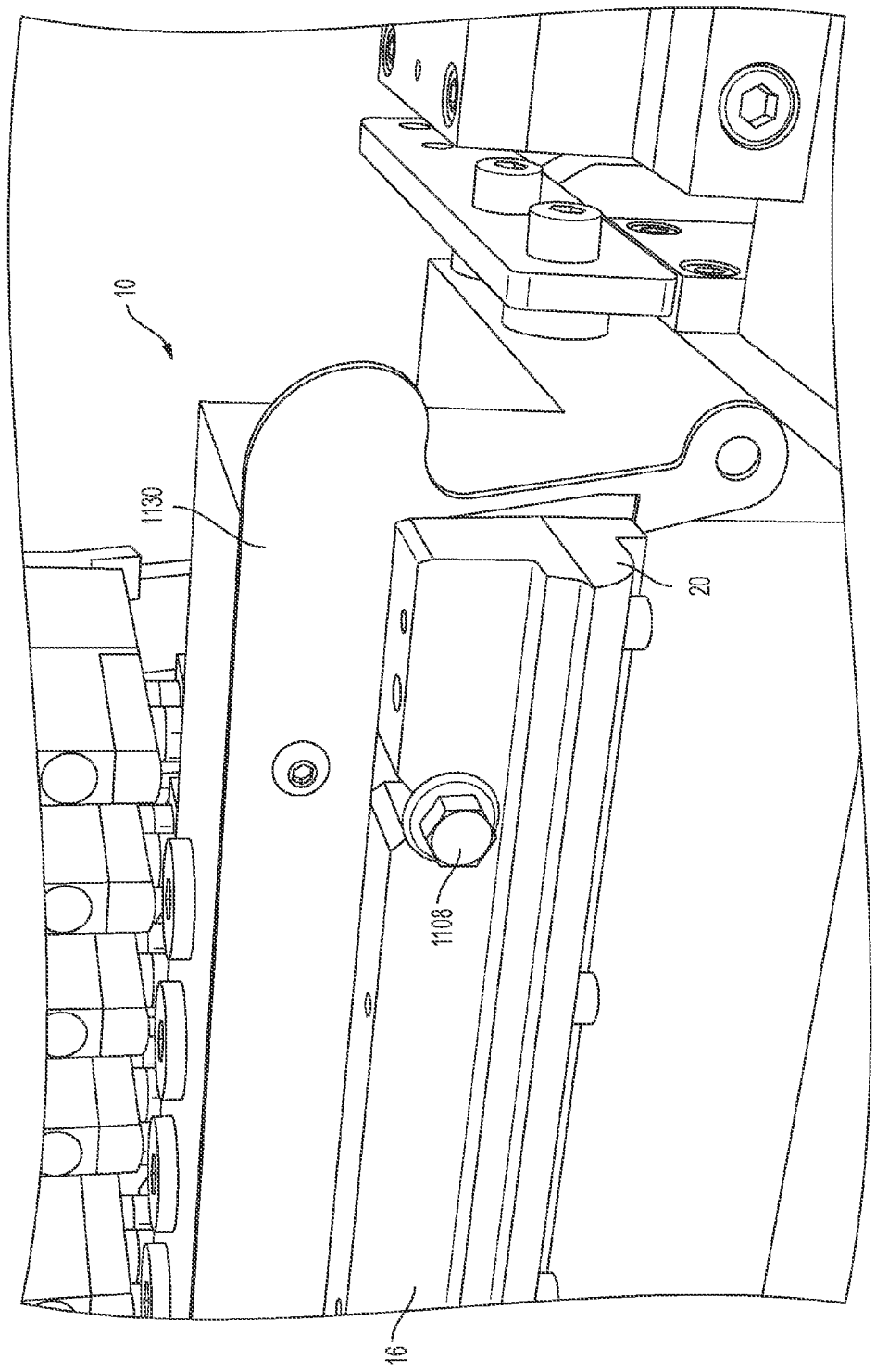
FIG. 23 is a partial perspective view of the fluid application device of FIG. 21.

FIGS. 21-23 illustrate the fluid application device 10 according to another embodiment. In this embodiment, the securing mechanism may be formed as a rear slotted nozzle system 1100 (FIG. 22). FIG. 21 is side view of the fluid application device having the rear slotted nozzle system 1100, and FIG. 22 is a bottom perspective view of the fluid application device 10 of FIG. 21. FIG. 23 is a partial perspective view of the fluid application device 10 of FIG. 21.

Referring to FIGS. 21-23, the rear slotted nozzle system 1100 includes a securing component formed as one or more fasteners 1104 secured in respective fastening bores (not shown) in the applicator head 14. In one embodiment, the fastener 1104 may be a threaded fastener such as a bolt threaded in a respective fastening bore. The fastener 1104 may include a shank 1106 at least partially positioned in the fastening bore and a head 1108 positioned at an opposite end. Optionally, a washer 1110 may be positioned about the shank 1106 adjacent to the head 1108.

The corresponding or mating securing component is formed as one or more slots or bores 1120 extending through thickness of the slot die assembly 12. In one embodiment, the slots 1120 are rear facing and extend through the die extruder 16. That is, the one or more slots 1120 include an open side, for example, on the rear facing side of the slot die assembly 12, configured to receive the fastener 1104. In one embodiment, the slots 1120 are open to the first (top) surface 24, the second (bottom) surface 26, and the fourth (rear) surface 30. Referring to FIG. 22, the number position of slots 1120 may correspond to the number and position of fasteners 1104. The fasteners 1104 may be tightened to secure the slot die assembly 12 to the applicator head 14, or loosened to remove the slot die applicator 12 from the applicator head 14. The head 1108 and/or washer 1110 are configured to support the die extruder 16, and in turn, the slot die assembly 12 at a shoulder 1122 adjacent to the slot 1120.

Referring to FIGS. 21-23, the fluid application device may further include a positioning mechanism 1130 in form of a guide plate secured to the applicator head 14. In one embodiment, the thickness of the guide plate 1130 provides a stop or ridge that the slot die assembly 12 may abut against when properly positioned on the applicator head 14.

Figure 24:
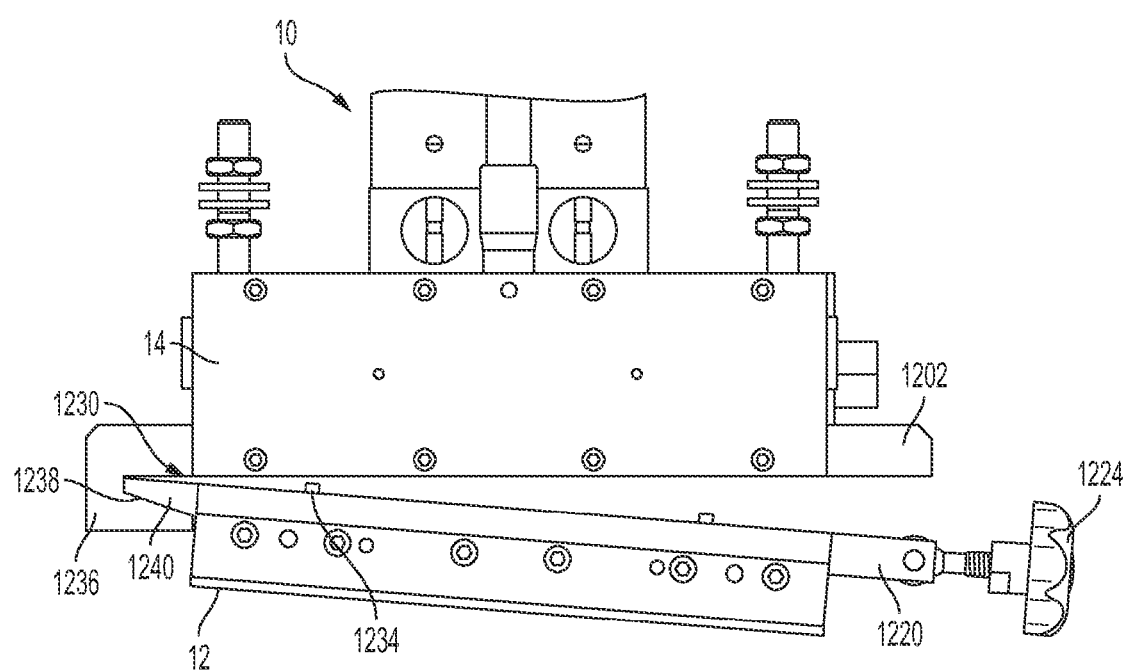
FIG. 24 is a rear view of a fluid application device according to another embodiment described herein.

FIG. 24 illustrates the fluid application device 10 according to another embodiment. The embodiment shown in FIG. 24 may be a variation or alternative of the embodiments shown in FIGS. 16 and 17. Accordingly, similar reference characters and terminology may be used to describe and identify features in in the embodiment of FIG. 24 that are similar to, or the same as, corresponding features in the embodiment of FIGS. 16 and 17.

Referring to FIG. 24, a rear view of the fluid application device 10 is shown. In this embodiment, the securing mechanism may be end mounted and includes a securing component formed generally as a wing 1202 extending from one side of the applicator head 14, the wing 1202 having an open slot 704 (FIG. 16) formed therein. The corresponding or mating securing component is a formed as a slot die assembly wing 1220, extending from the slot die assembly 12. In one embodiment, the slot die assembly wing 1220 extends from the die extruder 16. The slot die assembly wing 1220 includes an open slot 722 (FIG. 16) formed therein.

A screw clamp 1224 may be rotatably secured in the wing 1202 or slot die assembly wing 1220. As shown in FIG. 24, for example, the screw clamp 1224 may be rotatably mounted in the slot die assembly wing 1220 and is rotatable so that a shank of the screw clamp 1224 may be received in a slot of the wing 1202, where screw clamp 1224, for example, a head of the screw clamp 1224, may be rotated via threaded engagement with the shank to clamp against the wing 1202. The screw clamp 1224 may be rotated between an engaged position and a disengaged for position as described above with reference to FIGS. 16 and 17.

Referring still to FIG. 24, the fluid application device 10 may further include a positioning mechanism 1230. In one embodiment, the positioning mechanism 1230 includes a magnetic positioner. The magnetic positioner includes one or more magnetic elements 732 (FIG. 16) positioned in the applicator head 14 and one or more corresponding magnetic elements 1234 positioned in the slot die assembly 12. A magnetic attraction force between the magnetic element 732 and corresponding magnetic element 1234 aligns the slot die assembly 12 with the applicator 14 in a proper position so that the die extruder 16 may receive fluid from the applicator head 14. In addition, positioning mechanism may provide a sufficient attractive holding force to maintain the slot die assembly 12 in the proper position while the slot die assembly 12 is being affixed or secured to the applicator head 14 using any of the securing mechanisms described herein.

The positioning mechanism 1230 may further include a positioning ear 1236 having a positioning groove 1238 formed on one of the applicator head 14 and the slot die assembly 12, and a positioning lug 1240 formed on the other of the applicator head 14 and the slot die assembly 12, the positioning lug 1240 configured to be received in the positioning groove 1238. For example, as shown in FIG. 24, the positioning ear 1236 may be formed on, or secured to the applicator head 14, and the positioning lug 1240 may be formed on or secured to the slot die assembly 12. The lug 1240 may be positioned in the groove 1238 while the slot die assembly 12 is moved toward the applicator head 14. With the lug 1240 positioned in the groove 1238, the magnetic elements 732 and corresponding magnetic elements 1234 may be substantially aligned to so as to attract one another as the slot die assembly 12 is moved toward to the applicator 14 for initial positioning. The slot die assembly 12 may then be secured to the applicator head by way of the screw clamp 1224.

FIGS. 25-29 illustrate the fluid application device according to another embodiment described herein. The embodiment shown in FIGS. 25-29 may be a variation or alternative of the embodiments shown in FIG. 14. Accordingly, similar reference characters and terminology may be used to describe and identify features in the embodiment of FIGS. 25-29 that are similar to, or the same as, corresponding features in the embodiment of FIG. 14. In addition, features described in the embodiment shown in FIG. 14 may be incorporated in the embodiment of FIGS. 25-29 and vice versa, and further description of features identified above may be omitted below.

Figure 25:
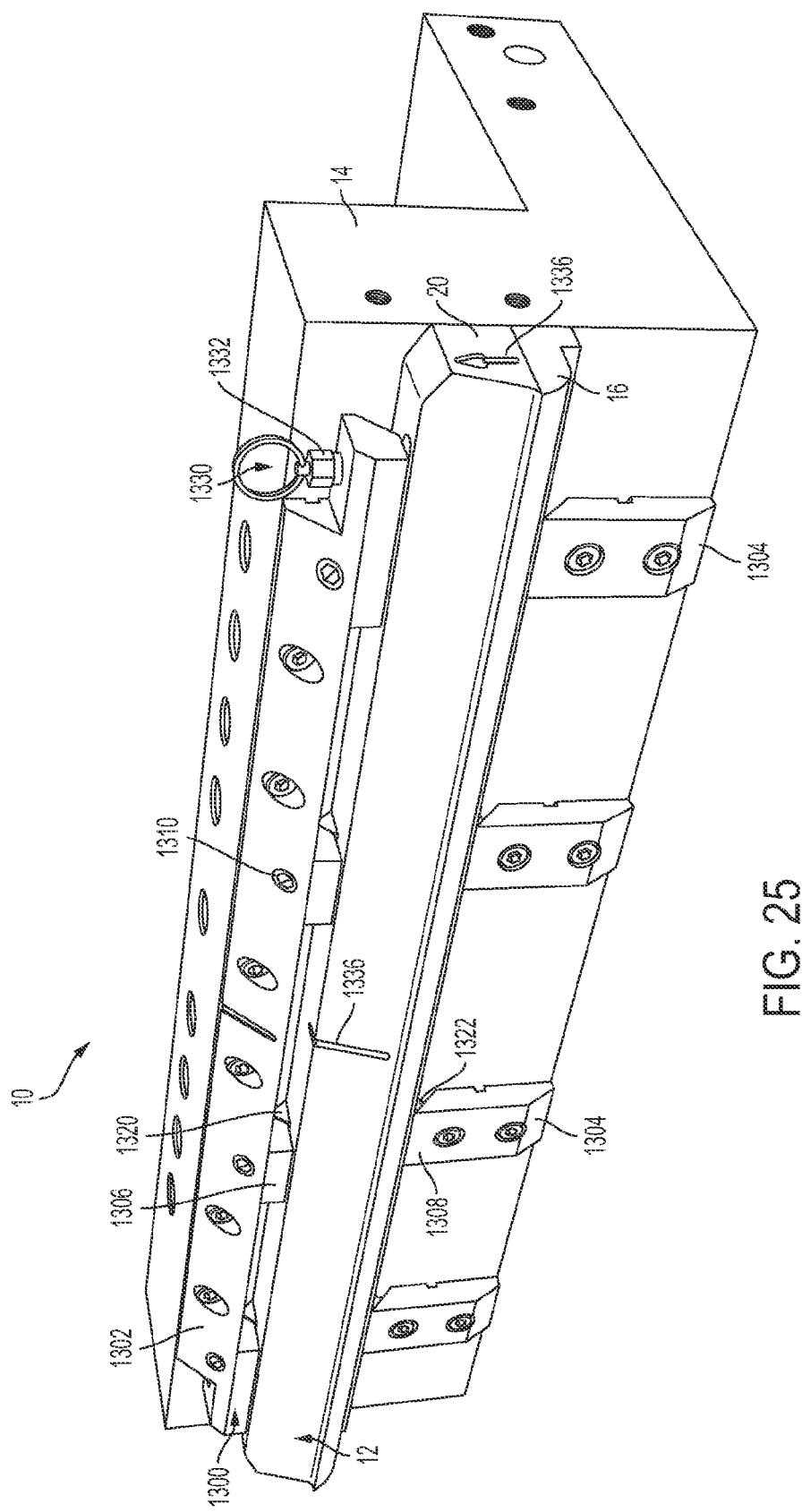
FIG. 25 is a perspective view of a fluid application device according to another embodiment described herein.
Figure 26A:
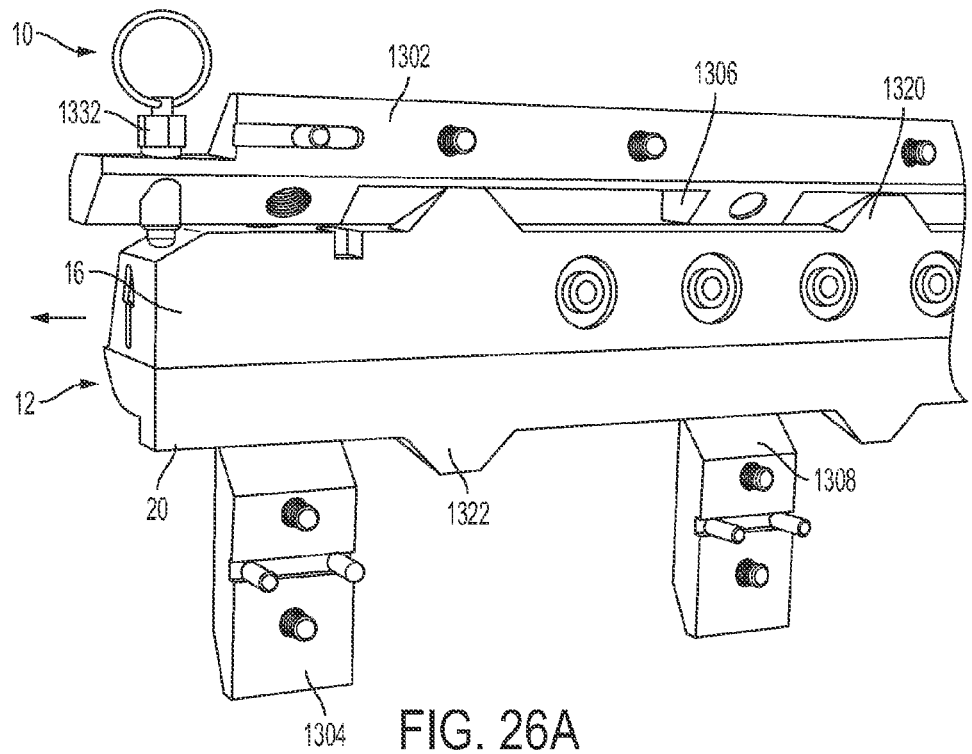
FIG. 26A is a perspective view of a securing mechanism of the fluid application device of FIG. 25 in an uninstalled condition.
Figure 26B:
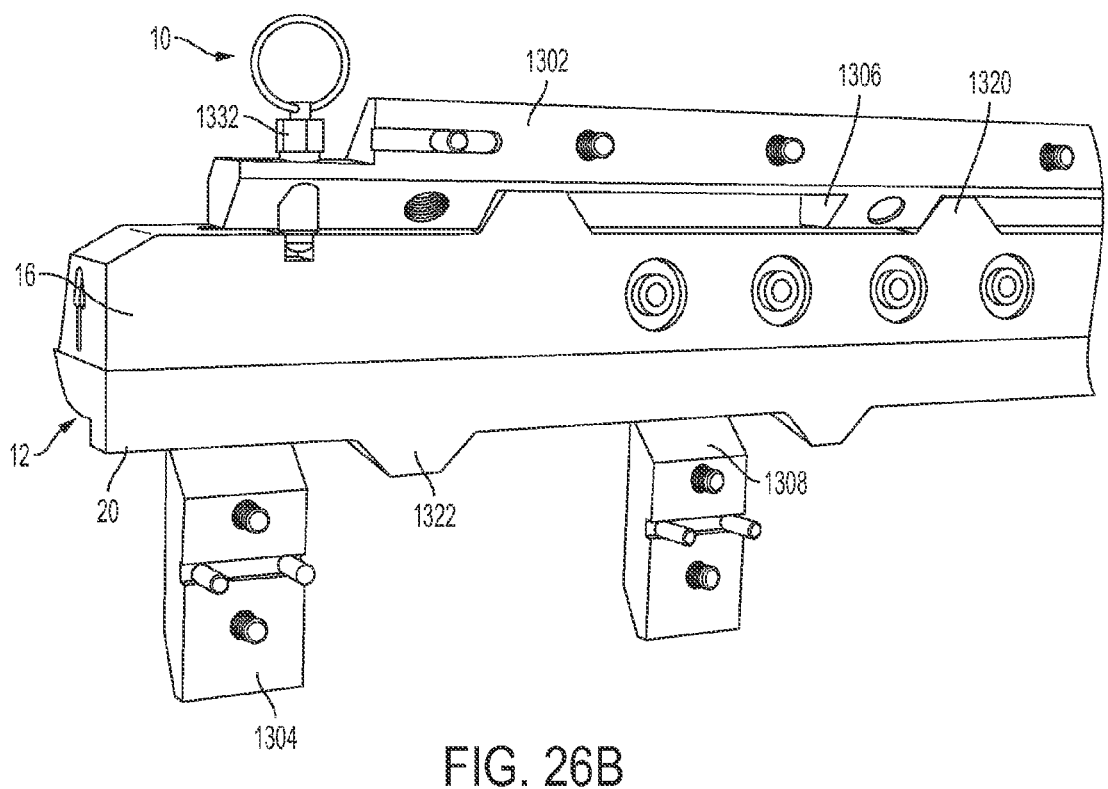
FIG. 26B is a perspective view of the securing mechanism of the fluid application device of FIG. 25 moved to an installed condition.
Figure 27:
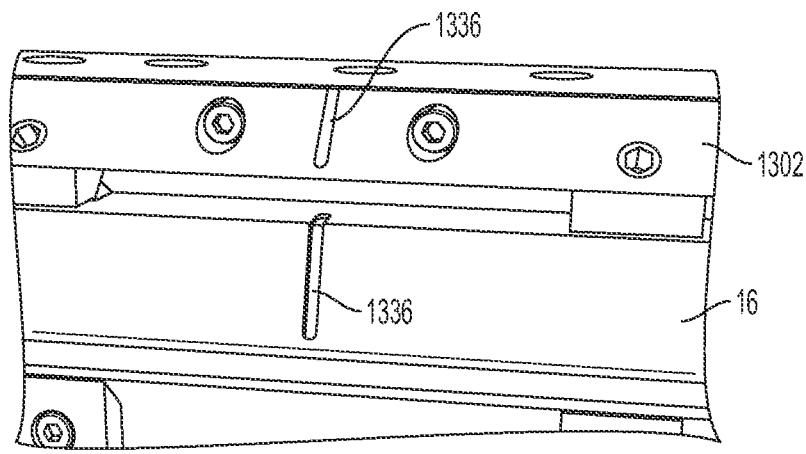
FIG. 27 is a perspective view showing an example of visual indicia of the fluid application device of FIG. 25.
Figure 28:
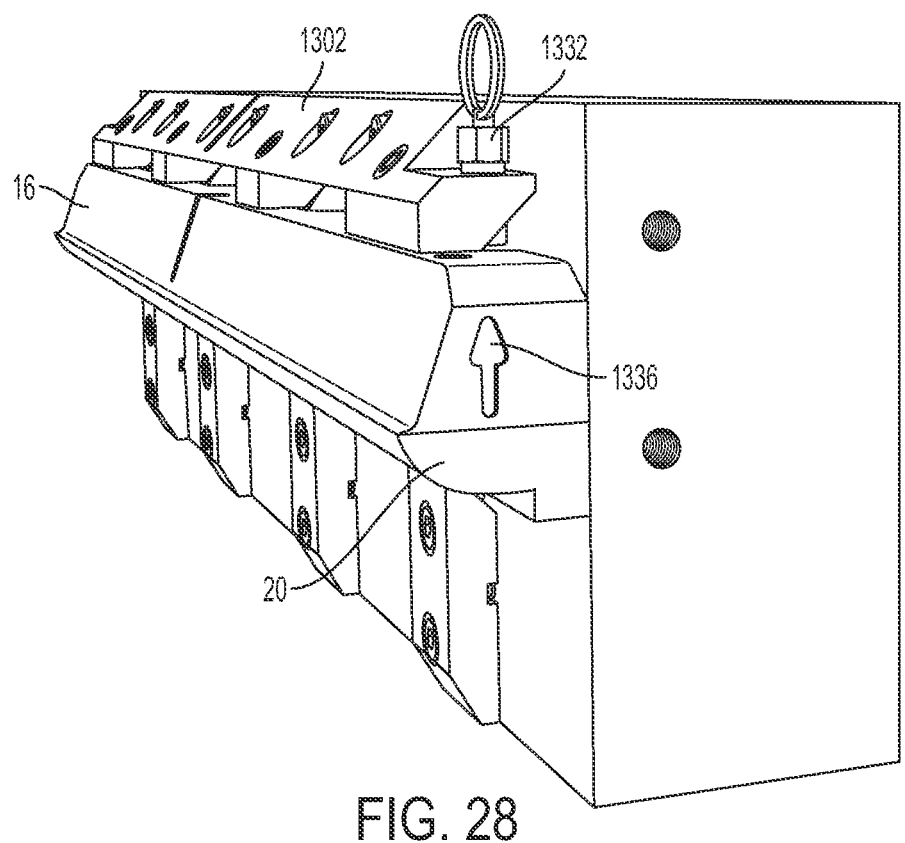
FIG. 28 is a perspective view showing another example of visual indicia of the fluid application device of FIG. 25.
Figure 29:
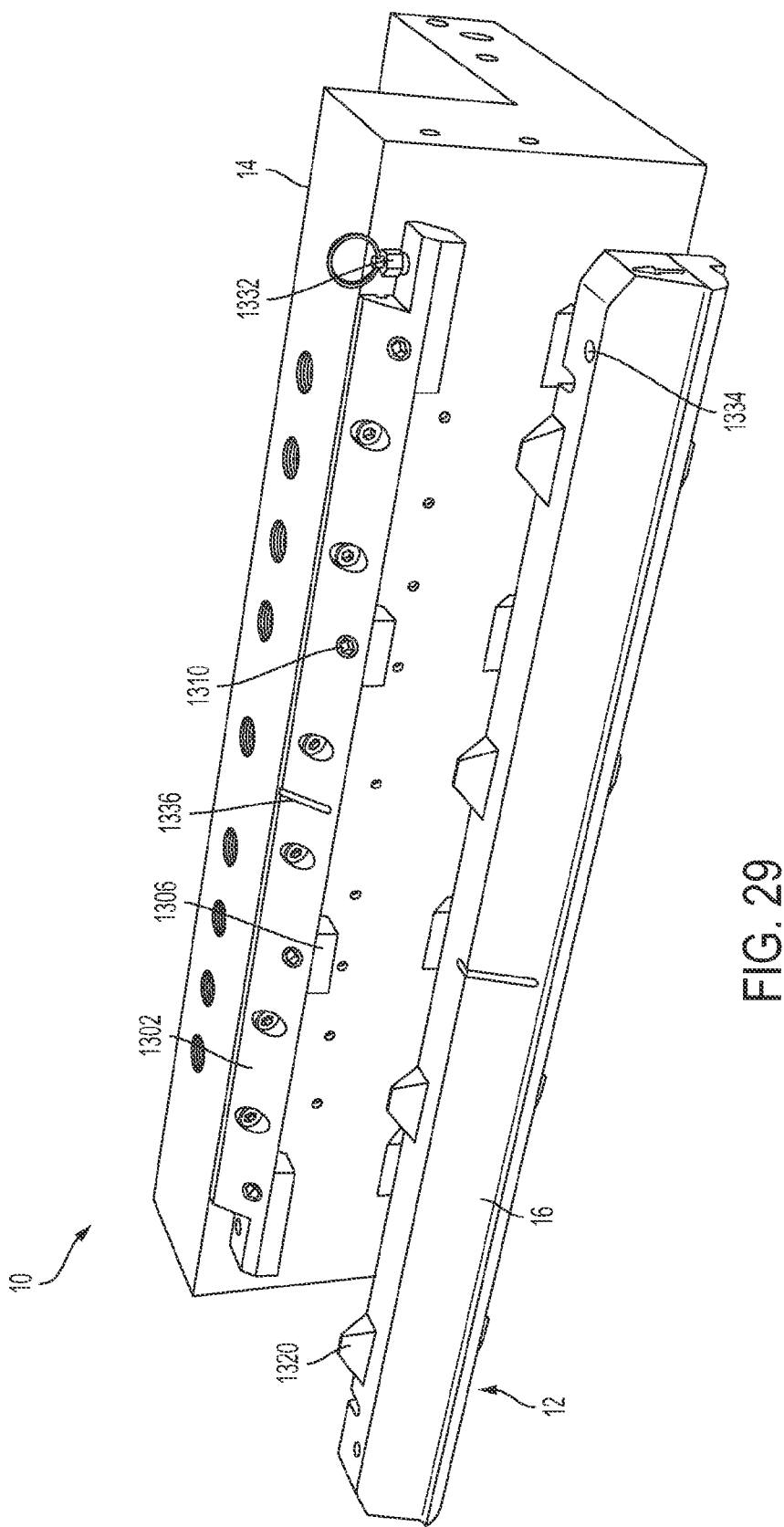
FIG. 29 is a partially exploded perspective view of the fluid application device of FIG. 25.

FIG. 25 is a bottom perspective view of a fluid application device 10 according to another embodiment described herein. FIGS. 26A and 26B are top perspective views of the securing mechanism and the slot die assembly 12 in an uninstalled condition (FIG. 26A) and moved into an installed condition (FIG. 26B). FIGS. 27-29 are various perspective views of the fluid application device 10 of FIG. 25. Referring to FIGS. 25-29, the securing mechanism for affixing the slot die assembly 12 to the applicator head 14 may generally be a cooperating dovetail, such as a front load dovetail 1300. The securing component includes a first dovetail block 1302 and a second dovetail block 1304 secured to the applicator head 14. The first and second dovetail blocks 1302, 1304 are spaced apart from one another and are configured to receive the slot die assembly 12 therebetween. The first dovetail block 1302 includes a plurality of spaced apart first support surfaces 1306 and the second dovetail block 1304 includes a plurality of spaced apart second support surfaces 1308. The second dovetail block 1304 may be formed as a plurality of discrete dovetail blocks 1304, each having a second support surface 1308.

The corresponding or mating securing component is formed as a plurality of first engaging surfaces 1320 on the die plate 20 and a plurality of second engaging surfaces 1322 on the die extruder 16. The first engaging surface 1320 may be formed generally in an angled or wedge shape, and have, for example, a trapezoidal profile. However, it is understood that the present disclosure is not limited to this configuration. For example, each first engaging surface 1320 may be formed having a square, rectangular, or similar profile.

Each first engaging surface 1320 of the plurality of first engaging surfaces 1320 is configured to engage a respective first support surface 1306 of the plurality of first support surfaces 1306. Similarly, each second engaging surface 1322 of the plurality of second engaging surfaces 1322 is configured to engage a respective second support surface 1308 of the plurality of second support surfaces 1308. Thus, in the installed condition shown in FIG. 26B, each first engaging surface is aligned with and supported by a corresponding first support surface 1306, and each second engaging surface 1322 is aligned with and supported by a corresponding second support surface 1308. In one embodiment, the first engaging surfaces 1320 and the first support surfaces 1306 may be formed as complimenting angled surfaces. Similarly, the second engaging surfaces 1322 and second support surfaces 1308 may be formed as complimenting angled surfaces.

The plurality of first and second support surfaces 1306, 1308 are configured to support the slot die assembly 12 via the plurality of first and second engaging surfaces 1320, 1322. The slot die assembly 12 may be secured in a desired position by tightening one or more fasteners 1310 extending through respective first support surfaces 1306 of the plurality of first support surfaces 1306, and/or respective second support surfaces 1308 of the plurality of second support surfaces 1308 to engage corresponding engaging surfaces 1320, 1322 of the slot die assembly 12 and apply a clamping force thereto. The one or more fasteners 1310 may be inserted through first or second dovetail block 1302, 1304 at a position that is angled away from the slot die assembly 12 so as to reduce or avoid interference from a fluid discharged from the slot die assembly 12.

The securing mechanism may further include a positioning mechanism 1330 including spring loaded plunger 1332 and a bore 1334 configured to selectively receive the plunger 1332. In one embodiment, the plunger 1332 may be secured to the applicator head 14 or first dovetail block 1302, and the bore 1334 may be formed in the slot die assembly 12. The spring loaded plunger 1332 may be urged to an extended position so as to project into the bore 1334 when the slot die assembly 12 is properly positioned in the installed condition. For example, the bore 1334 may be formed in the die plate 20. Accordingly, the slot die assembly 12 may be moved relative to the applicator head 14 with the spring loaded plunger 1332 held against a biasing force in the retracted position, for example, by contacting an external surface of the slot die assembly 12. When the bore 1334 is aligned with the spring loaded plunger 1332, the plunger 1332, under the biasing force, may project outwardly to be received in the bore 1334 and limit or prevent additional lateral movement of the slot die assembly 12 relative to the applicator head 14. The slot die assembly 12 is properly positioned for securing to the applicator head 14 when the spring loaded plunger 1332 is received in the bore 1334.

The positioning mechanism 1330 may further include visual indicia 1336 formed or position on the slot die assembly 12, the securing mechanism 1300 and/or the applicator head 14. For example, in one embodiment, the visual indicia may include an arrow formed on the slot die assembly 12 indicating a proper orientation of the slot die assembly 12. The visual indicia 1336 may further include groove, line or similar indicator formed in the slot die assembly 12 and a corresponding groove, line or similar indicator formed in the first dovetail block 1302. The corresponding indicators may be aligned to indicate or confirm a proper position of the slot die assembly 12 on the applicator head 14.

In use, according to one embodiment, the slot die assembly 12 may be positioned relative to the first and second dovetail blocks 1302, 1304 with the plurality of first and second engaging surfaces 1320, 1322 positioned between corresponding support surfaces 1306, 1308 of the first and second dovetail blocks. The slot die assembly 12 may then be properly positioned by sliding relative to the first and second dovetail blocks 1302, 1304 until each first and second engaging surface 1320, 1322 is aligned with and engages a respective first and second support surface 1306, 1308, and the plunger 1332 is received in the bore 1334. The fasteners 1310 may then be actuated to secure and maintain the slot die assembly 12 in position and ready for use.

Figure 30:
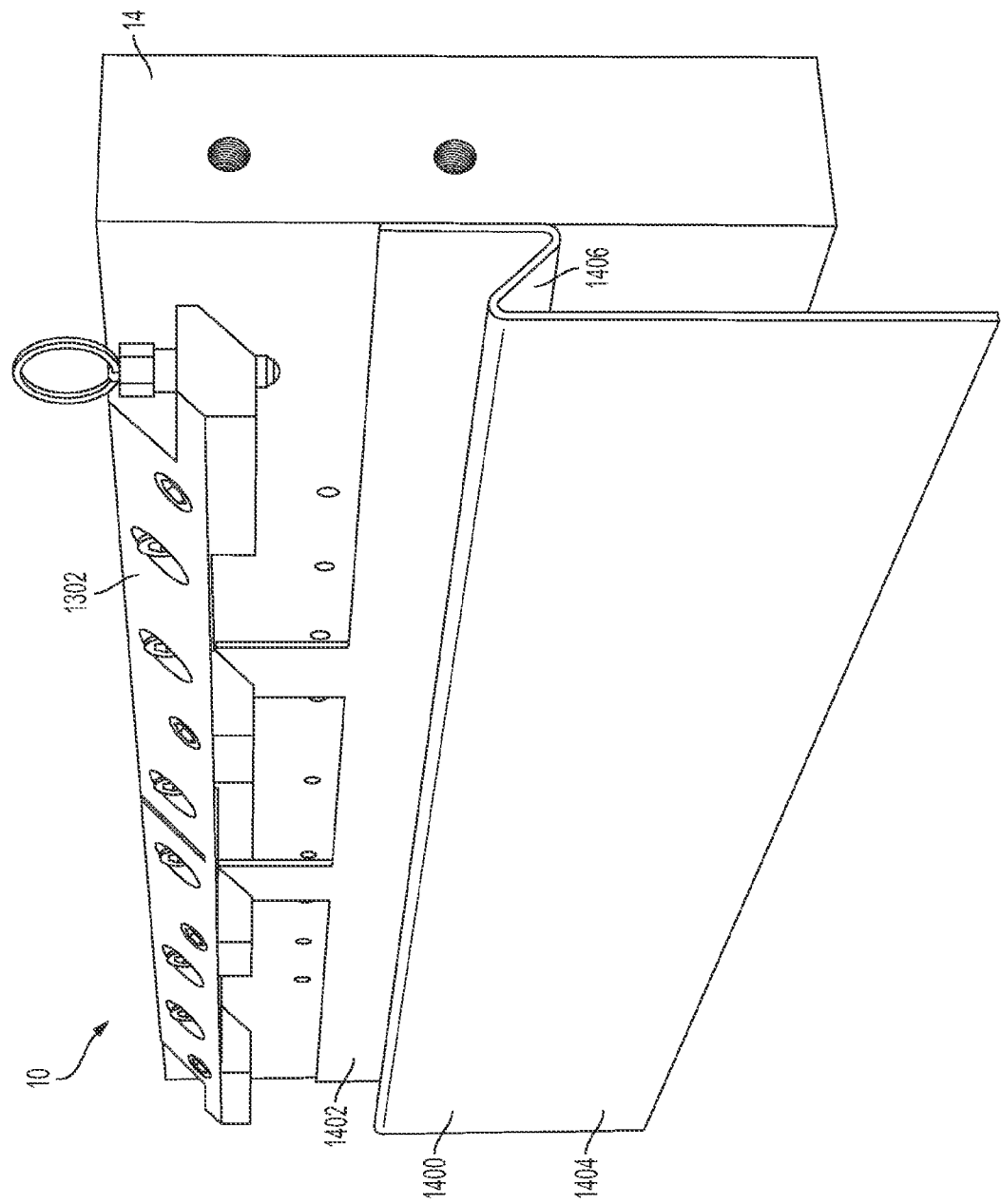
FIG. 30 is a perspective view showing an example of a drip tray plate for flushing a fluid application device described herein.

FIG. 30 is a perspective view of a drip tray plate 1400 for flushing a fluid application device 10, according to an embodiment described here. Referring to FIG. 34, the drip tray 1400 may be secured to or positioned on the applicator head 14. A first portion of the drip tray 1400 may abut the applicator head 14 and a second portion may be spaced from the applicator head 14. An intermediate segment 1406 may extend between the first portions 1402 and second portion 1404. In one embodiment, the intermediate segment extends at a non-right angle between the first portion 1402 and second portion 1404.

It is understood that in the embodiments above, the securing component may be formed on one of the applicator head 14 or slot die assembly 12, and the corresponding securing component may be formed on the other of the applicator head 14 and slot die assembly 12. It is also understood that various features of the above embodiments may be combined and used together, even if not specifically described above or shown in the figures. For example, embodiments having a slot die assembly 12 that is supported at or near opposite ends, may also include additional support at a central portion, for example, by including a dovetail segment or using an additional fastener that may be tightened or loosened.

It will be appreciated by those skilled in the art that the relative directional terms such as upper, lower, rearward, forward and the like are for explanatory purposes only and are not intended to limit the scope of the disclosure.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular. For example, one or more fasteners 16 may used in the embodiments above. Similarly, the die extruder may include one more fastening bores and one or more insertion bores.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A fluid application device comprising:
   an applicator head;
   a slot die assembly comprising:
      a die extruder comprising one or more fluid input ports configured to receive a fluid from the applicator head;
      a shim positioned adjacent to the die extruder; and
      a plate positioned adjacent to the shim on a side of the shim opposite from the die extruder; and
   a securing mechanism configured to secure the slot die assembly to the applicator head, the securing mechanism comprising a securing component at one of the applicator head and the slot die assembly, and a corresponding securing component at the other of the applicator head and slot die assembly,
   wherein the securing component includes first and second spaced apart support surfaces on the applicator head configured to receive the slot die assembly therebetween, and the corresponding securing component includes first and second engaging surfaces formed on the slot die assembly configured to engage the respective first and second support surfaces.

2. The fluid application device of claim 1, further comprising a positioning mechanism.

3. The fluid application device of claim 2, wherein the positioning mechanism includes a spring loaded plunger.

4. The fluid application device of claim 3, wherein the positioning mechanism further includes a bore configured to receive the plunger.

5. The fluid application device of claim 4, wherein the spring loaded plunger is positioned on the securing component of the applicator head and the bore is positioned on the slot die assembly, such that the spring loaded plunger is urged into the bore when the slot die assembly is properly positioned relative to the securing component.

6. The fluid application device of claim 2, wherein the positioning mechanism includes visual indicia formed on at least one of the applicator head, securing component, corresponding securing component and slot die assembly.

7. The fluid application device of claim 1, wherein the second support surface is actuatable toward the second engaging surface for engagement therewith to affix the slot die assembly to the applicator head.

8. A fluid application device comprising:
   an applicator head;
   a slot die assembly comprising:
      a die extruder comprising one or more fluid input ports configured to receive a fluid from the applicator head;
      a shim positioned adjacent to the die extruder; and
      a plate positioned adjacent to the shim on a side of the shim opposite from the die extruder; and
   a securing mechanism configured to secure the slot die assembly to the applicator head, the securing mechanism comprising a securing component at one of the applicator head and the slot die assembly, and a corresponding securing component at the other of the applicator head and slot die assembly,
   wherein the securing component includes first and second spaced apart dovetail blocks on the applicator head configured to receive the slot die assembly therebetween, and the corresponding securing component includes first and second engaging surfaces formed on the slot die assembly configured to engage the respective first and second dovetail blocks, wherein a fastener is received through at least one of the first dovetail block and second dovetail block to engage the corresponding engaging surface.

9. The fluid application device of claim 8, wherein the first dovetail block includes a plurality of spaced apart first support surfaces, the second dovetail block includes a plurality of spaced apart second support surfaces, and the first and second engaging surfaces include a plurality of first and second engaging surfaces, respectively, wherein each first engaging surface engages a respective first support surface, and each second engaging surface engages a respective second support surface.

10. The fluid application device of claim 9, wherein the second dovetail block includes a plurality of discrete, spaced apart second dovetail blocks, each second dovetail block having a second support surface formed thereon.

* * * * *